(12) United States Patent
Sundararajan et al.

(10) Patent No.: US 11,330,632 B2
(45) Date of Patent: May 10, 2022

(54) POSITIONING USING RANDOM ACCESS CHANNEL (RACH)

(71) Applicant: QUALCOMM Incorporated, San Diego, CA (US)

(72) Inventors: Jay Kumar Sundararajan, San Diego, CA (US); Alexandros Manolakos, San Diego, CA (US); Tingfang Ji, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 16/745,198

(22) Filed: Jan. 16, 2020

(65) Prior Publication Data

US 2020/0236718 A1    Jul. 23, 2020

(30) Foreign Application Priority Data

Jan. 18, 2019   (GR) .............................. 20190100036
Jan. 30, 2019   (GR) .............................. 20190100050

(51) Int. Cl.
*H04W 74/08* (2009.01)
*H04W 64/00* (2009.01)
(Continued)

(52) U.S. Cl.
CPC ....... *H04W 74/0833* (2013.01); *H04L 5/0051* (2013.01); *H04L 27/2607* (2013.01);
(Continued)

(58) Field of Classification Search
None
See application file for complete search history.

(56) References Cited

U.S. PATENT DOCUMENTS

2011/0116436 A1   5/2011   Bachu et al.
2011/0205964 A1   8/2011   Fix et al.
(Continued)

FOREIGN PATENT DOCUMENTS

| CN | 101931860 B | 6/2014 | |
|---|---|---|---|
| WO | 2010151830 A2 | 12/2010 | |
| WO | WO-2020146739 A1 * | 7/2020 | .......... H04W 64/003 |

OTHER PUBLICATIONS

International Search Report and Written Opinion—PCT/US2020/014057—ISA/EPO—dated Apr. 8, 2020.
(Continued)

*Primary Examiner* — Scott M Sciacca
(74) *Attorney, Agent, or Firm* — QUALCOMM Incorporated

(57) ABSTRACT

Disclosed are techniques for measuring round trip times (RTTs) between a user equipment (UE) and a plurality of transmission-reception points (TRPs). In an aspect, the UE receives a positioning configuration message from a TRP, measures a time of arrival (TOA) of each of a plurality of positioning signals from the plurality of TRPs, and transmits, to the TRP, a RACH positioning Message A on uplink resources defined in the positioning configuration message, and receives, from the TRP, a RACH positioning Message B subsequent to transmitting the RACH positioning Message A, wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

76 Claims, 17 Drawing Sheets

(51) Int. Cl.
    *H04W 24/10*     (2009.01)
    *H04W 56/00*     (2009.01)
    *H04L 27/26*     (2006.01)
    *H04L 5/00*     (2006.01)

(52) U.S. Cl.
    CPC ......... *H04W 24/10* (2013.01); *H04W 56/001* (2013.01); *H04W 64/003* (2013.01)

(56) References Cited

U.S. PATENT DOCUMENTS

2020/0107209 A1*   4/2020  Ratasuk ................ G01S 5/0236
2020/0146054 A1*   5/2020  Jeon ..................... H04L 5/0053

OTHER PUBLICATIONS

Nokia, et al., "Idle and Inactive Mode Positioning for NR", 3GPP Draft, 3GPP TSG RAN WG1 Meeting #AH-1901, R1-1901027 Idle and Inactive, 3rd Generation Partnership Project (3GPP). Mobile Competence Centre, 650, Route Des Lucioles, F-06921 Sophia-Antipolis Cedex, France, vol. RAN WG1, No. Taipei, Taiwan, Jan. 21, 2019-Jan, 25, 2019, Jan. 11, 2019 (Jan. 11, 2019), XP051576561, 3 Pages, Retrieved from the Internet: URL: http://www.3gpp.org/ftp/tsg%5Fran/WG1%5FRL1/TSGR1%5FAH/NR%5FAH%5F1901/Docs/R1%2D1901027%2Ezip, [retrieved on Jan. 11, 2019], pp. 1-3.

\* cited by examiner

POSITIONING USING RANDOM ACCESS CHANNEL (RACH)

CROSS-REFERENCE TO RELATED APPLICATIONS

The present Application for Patent claims priority under 35 U.S.C. § 119 to Greek Patent Application No. 20190100036, entitled "POSITIONING USING RACH," filed Jan. 18, 2019, and to Greek Patent Application No. 20190100050, entitled "POSITIONING USING RANDOM ACCESS CHANNEL (RACH)," filed Jan. 30, 2019, each of which are assigned to the assignee hereof, and expressly incorporated herein by reference in their entirety.

TECHNICAL FIELD

Various aspects described herein generally relate to wireless communication systems, and more particularly, to positioning using random access channel (RACH) procedure.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps).

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device can also be configured to report the time of arrival (ToA) of RF signals.

With OTDOA, when the mobile device reports the time difference of arrival (TDOA) between RF signals from two network nodes, the location of the mobile device is then known to lie on a hyperbola with the locations of the two network nodes as the foci. Measuring TDOAs between multiple pairs of network nodes allows for solving for the mobile device's position as intersections of the hyperbolas.

Round trip time (RTT) is another technique for determining a position of a mobile device. RTT is a two-way messaging technique (network node to mobile device and mobile device to network node), with both the mobile device and the network node reporting their receive-to-transmit (Rx-Tx) time differences to a positioning entity, such as a location server or location management function (LMF), that computes the mobile device's position. This allows for computing the back-and-forth flight time between the mobile device and the network node. The location of the mobile device is then known to lie on a circle with a center at the network node's position. Reporting RTTs with multiple network nodes allows the positioning entity to solve for the mobile device's position as the intersections of the circles.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In an aspect, a method of wireless communication performed by a user equipment (UE) includes receiving a positioning configuration message from a transmission-reception point (TRP), the positioning configuration message defining uplink resources configured for use by the UE to send a random access channel (RACH) positioning Message A to the TRP; measuring a time of arrival (TOA) of each of a plurality of positioning signals from a plurality of TRPs; transmitting, to the TRP, the RACH positioning Message A on the uplink resources defined in the positioning configuration message; and receiving, from the TRP, a RACH positioning Message B subsequent to transmitting the RACH positioning Message A, wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

In an aspect, a method of wireless communication performed by a TRP includes broadcasting a positioning configuration message defining uplink resources configured for use by one or more UEs to send a RACH positioning Message A to the TRP; broadcasting a positioning signal to the one or more UEs; receiving, from the one or more UEs, the RACH positioning Message A on the uplink resources defined in the positioning configuration message; and transmitting, to the one or more UEs, a RACH positioning Message B subsequent to receiving the RACH positioning Message A, wherein the RACH positioning Message A includes a first plurality of positioning measurements corresponding to a plurality of TRPs measured by the one or more UEs, the RACH positioning Message B includes a second plurality of positioning measurements corresponding to the plurality of TRPs, or any combination thereof.

In an aspect, a UE includes a transceiver circuitry; a memory circuitry; and a processor circuitry, wherein the transceiver circuitry, the memory circuitry, and the processor circuitry are configured to: receive a positioning configuration message from a TRP, the positioning configuration message defining uplink resources configured for use by the UE to send a RACH positioning Message A to the TRP; measure a time of arrival (TOA) of each of a plurality of positioning signals from a plurality of TRPs; transmit, to the TRP, the RACH positioning Message A on the uplink resources defined in the positioning configuration message; and receive, from the TRP, a RACH positioning Message B subsequent to transmission of the RACH positioning Message A, wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

In an aspect, a TRP includes a transceiver circuitry; a memory circuitry; and a processor circuitry, wherein the transceiver circuitry, the memory circuitry, and the processor circuitry are configured to: broadcast a positioning configuration message defining uplink resources configured for use by one or more UEs to send a RACH positioning Message A to the TRP; broadcast a positioning signal to the one or more UEs; receive, from the one or more UEs, the RACH positioning Message A on the uplink resources defined in the positioning configuration message; and transmit, to the one or more UEs, a RACH positioning Message B subsequent to reception of the RACH positioning Message A, wherein the RACH positioning Message A includes a first plurality of positioning measurements corresponding to a plurality of TRPs measured by the one or more UEs, the RACH positioning Message B includes a second plurality of positioning measurements corresponding to the plurality of TRPs, or any combination thereof.

In an aspect, a UE includes means for receiving a positioning configuration message from a TRP, the positioning configuration message defining uplink resources configured for use by the UE to send a RACH positioning Message A to the TRP; means for measuring a time of arrival (TOA) of each of a plurality of positioning signals from a plurality of TRPs; means for transmitting, to the TRP, the RACH positioning Message A on the uplink resources defined in the positioning configuration message; and means for receiving, from the TRP, a RACH positioning Message B subsequent to transmission of the RACH positioning Message A, wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

In an aspect, a TRP includes means for broadcasting a positioning configuration message defining uplink resources configured for use by one or more UEs to send a RACH positioning Message A to the TRP; means for broadcasting a positioning signal to the one or more UEs; means for receiving, from the one or more UEs, the RACH positioning Message A on the uplink resources defined in the positioning configuration message; and means for transmitting, to the one or more UEs, a RACH positioning Message B subsequent to reception of the RACH positioning Message A, wherein the RACH positioning Message A includes a first plurality of positioning measurements corresponding to a plurality of TRPs measured by the one or more UEs, the RACH positioning Message B includes a second plurality of positioning measurements corresponding to the plurality of TRPs, or any combination thereof.

In an aspect, a non-transitory computer-readable medium storing computer-executable instructions includes computer-executable instructions comprising: at least one instruction instructing a UE to receive a positioning configuration message from a TRP, the positioning configuration message defining uplink resources configured for use by the UE to send a RACH positioning Message A to the TRP; at least one instruction instructing the UE to measure a time of arrival (TOA) of each of a plurality of positioning signals from a plurality of TRPs; and at least one instruction instructing the UE to transmit, to the TRP, the RACH positioning Message A on the uplink resources defined in the positioning configuration message; and at least one instruction instructing the UE to receive, from the TRP, a RACH positioning Message B subsequent to transmission of the RACH positioning Message A, wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

In an aspect, a non-transitory computer-readable medium storing computer-executable instructions includes computer-executable instructions comprising: at least one instruction instructing a TRP to broadcast a positioning configuration message defining uplink resources configured for use by one or more UEs to send a RACH positioning Message A to the TRP; at least one instruction instructing the TRP to broadcast a positioning signal to the one or more UEs; at least one instruction instructing the TRP to receive, from the one or more UEs, the RACH positioning Message A on the uplink resources defined in the positioning configuration message; and at least one instruction instructing the TRP to transmit, to the one or more UEs, a RACH positioning Message B subsequent to receiving the RACH positioning Message A, wherein the RACH positioning Message A includes a first plurality of positioning measurements corresponding to a plurality of TRPs measured by the one or more UEs, the RACH positioning Message B includes a second plurality of positioning measurements corresponding to the plurality of TRPs, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
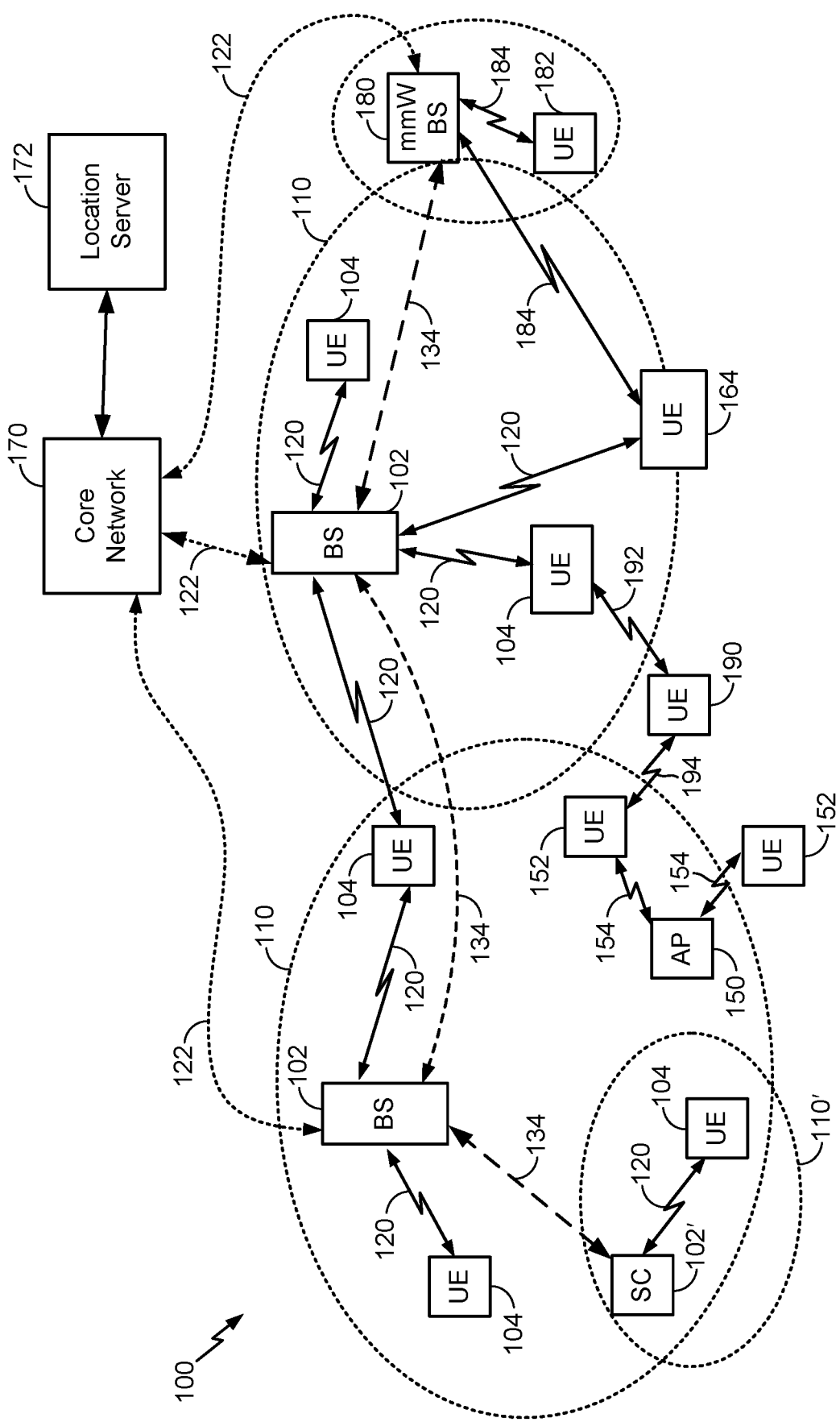
FIG. 1 illustrates a high-level system architecture of a wireless communications system in accordance with an aspect of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
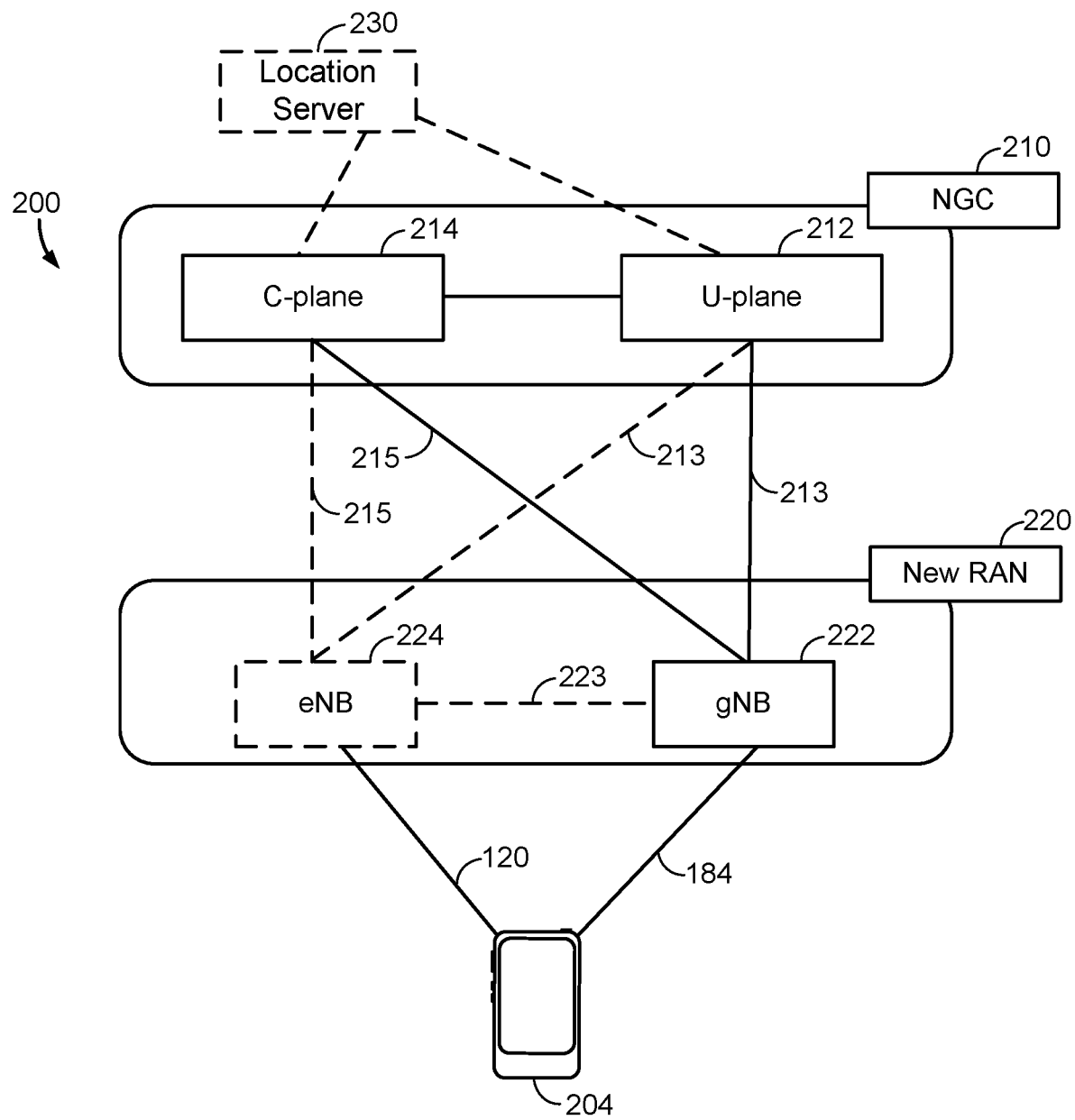
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternatively may each correspond to a single server. The location server 230 can be configured to support one or more location services for UEs 204 that can connect to the location server 230 via the core network, NGC 210, and/or via the Internet (not illustrated).

Further, the location server 230 may be integrated into a component of the core network, or alternatively may be external to the core network.

Figure 2B:
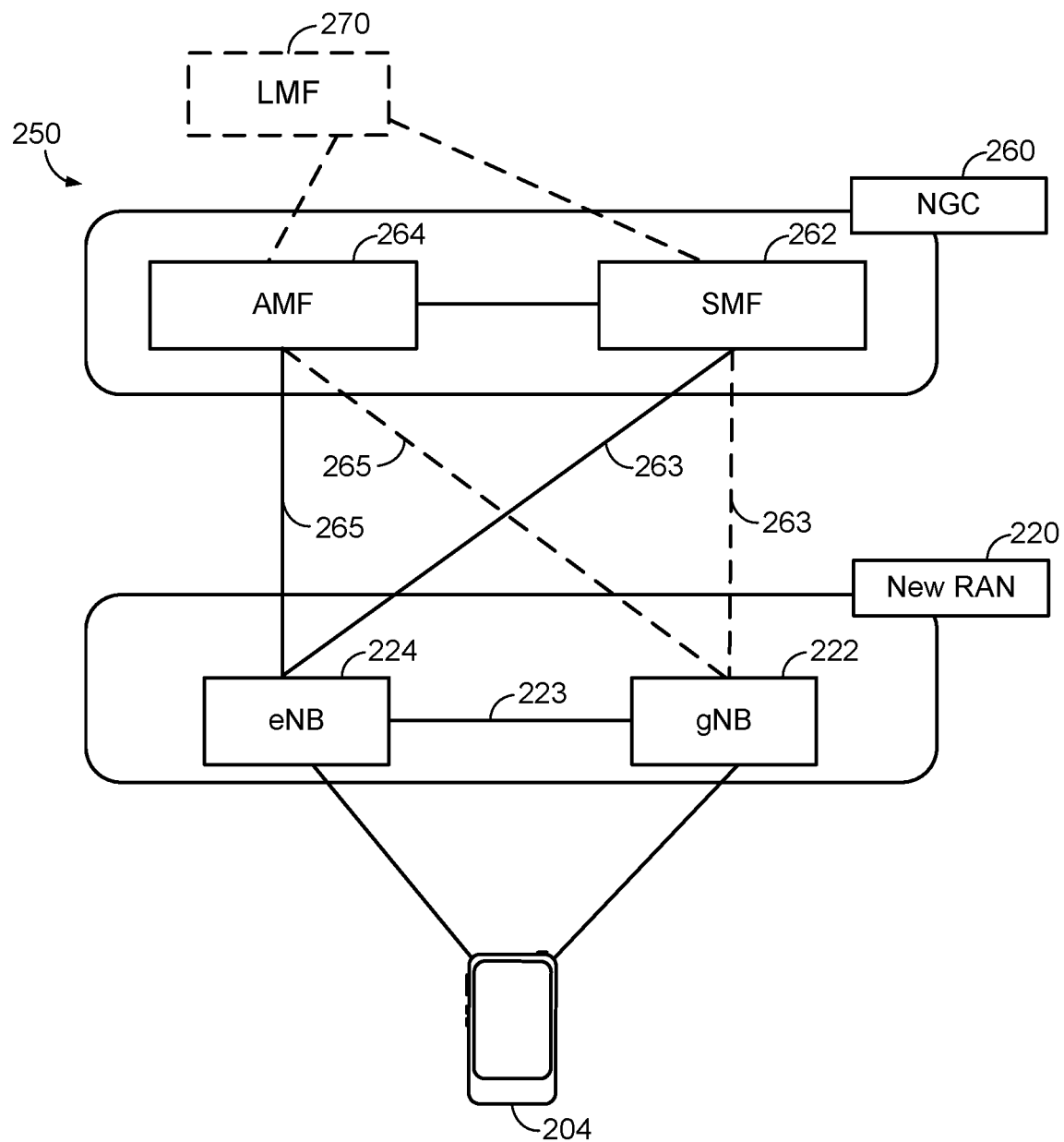

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
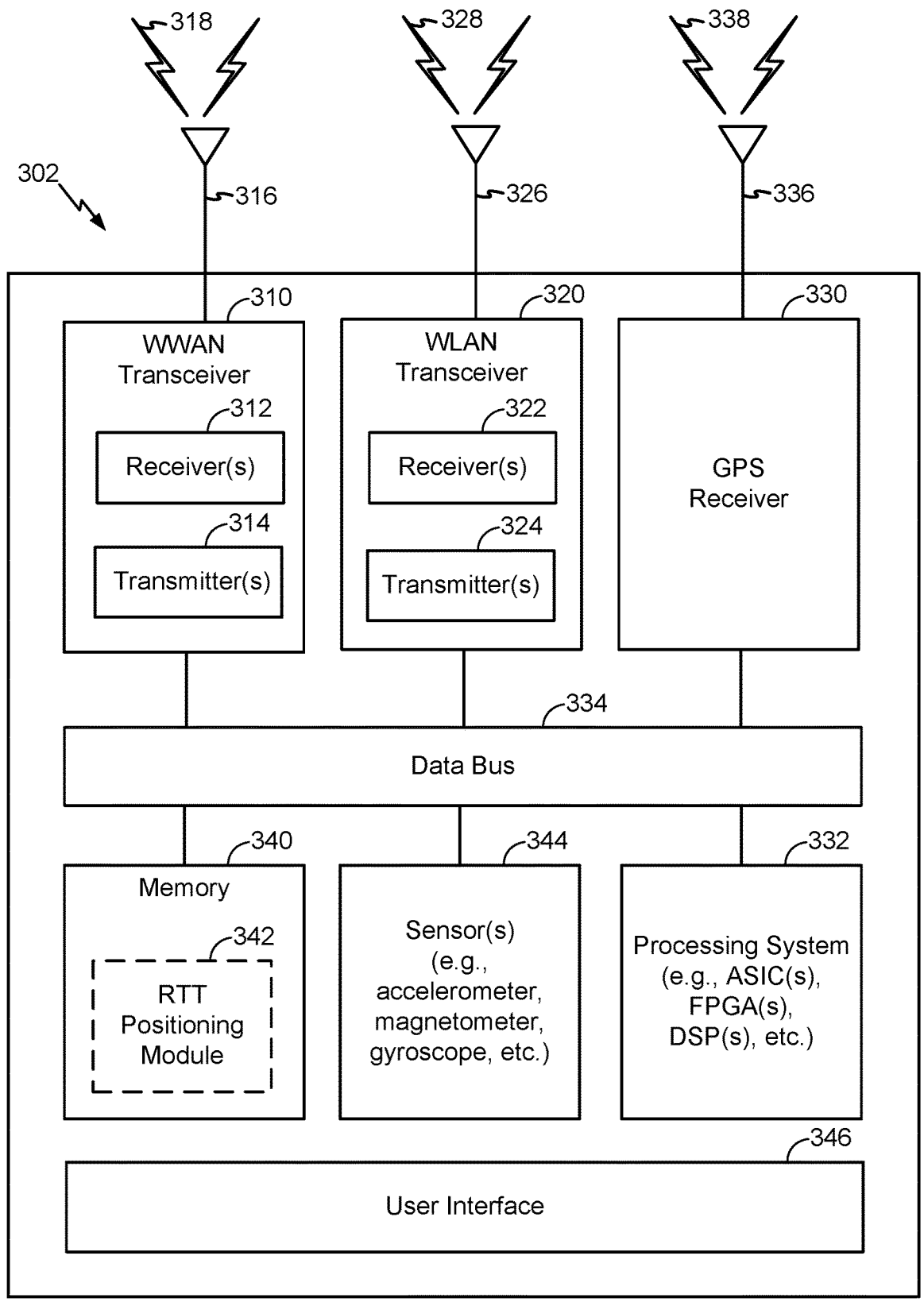
FIGS. 3A to 3C are simplified block diagrams of several sample aspects of components that may be employed in a UE, a base station, and a network entity, respectively, and configured to support communication in accordance with one or more aspects of the disclosure.
Figure 3B:
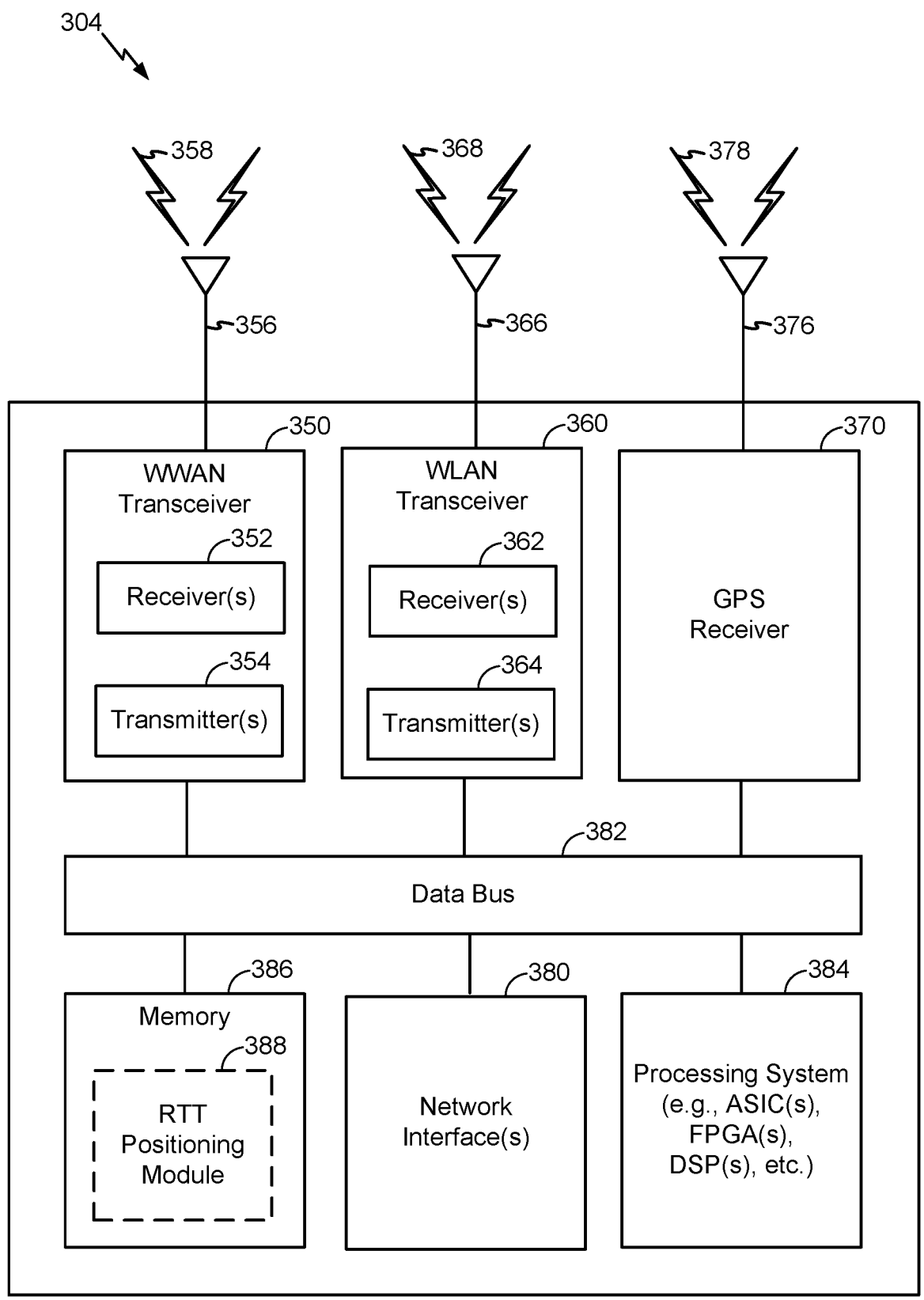
Figure 3C:
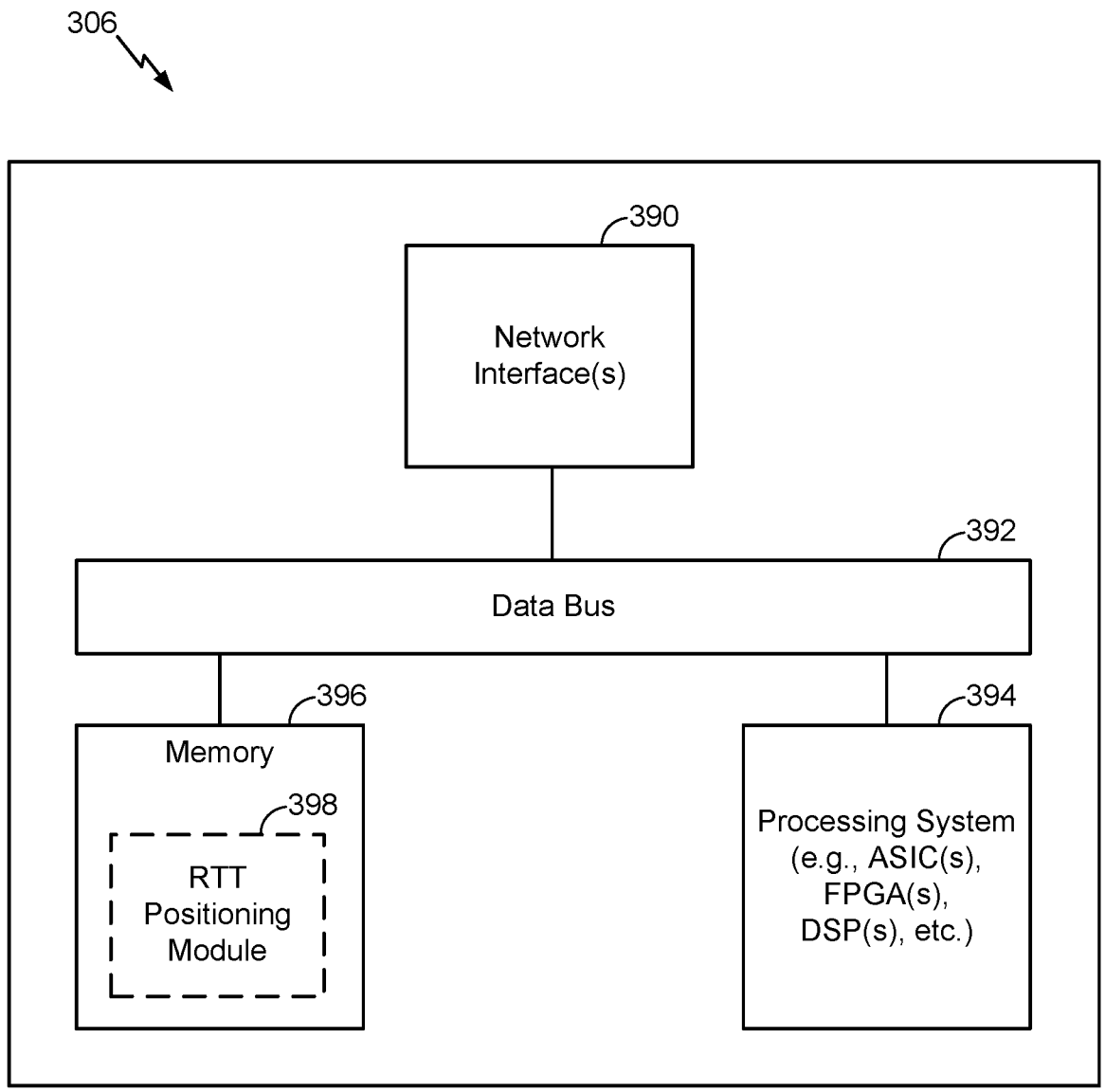

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, global positioning systems (GPS) receivers 330 and 370. The GPS receivers 330 and 370 may be connected to one or more antennas 336 and 376, respectively, for receiving GPS signals 338 and 378, respectively. The GPS receivers 330 and 370 may comprise any suitable hardware and/or software for receiving and processing GPS signals 338 and 378, respectively. The GPS receivers 330 and 370 request information and operations as appropriate from the other systems, and performs calculations necessary to determine the apparatus' 302 and 304 positions using measurements obtained by any suitable GPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, RTT measurements in a licensed or unlicensed frequency band as disclosed herein and for providing other processing functionality. The base station 304 includes a processing system 384 for providing functionality relating to, for example, RTT measurements in a licensed or unlicensed frequency band as disclosed herein and for providing other processing functionality. The network entity 306 includes a processing system 394 for providing functionality relating to, for example, RTT measurements in a licensed or unlicensed frequency band as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include RTT positioning modules 342, 388, and 398, respectively. The RTT positioning modules 342, 388, and 398 may be hardware circuits that are part of or coupled to the processing systems 332, 384, and 394, respectively, that, when executed, cause the apparatuses 302, 304, and 306 to perform the functionality described herein. Alternatively, the RTT positioning modules 342, 388, and 398 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RTT positioning modules 342, 388, and 398, etc.

A position estimate for a UE (e.g., UE 104) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 4A:
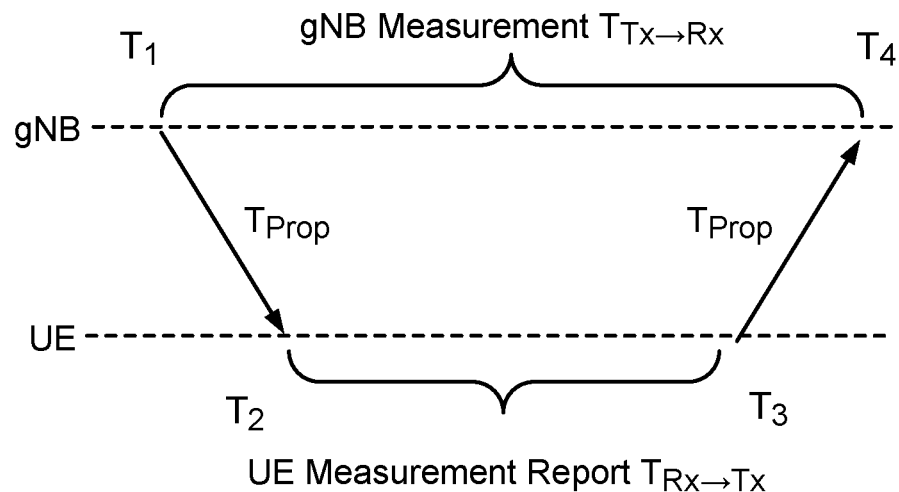
FIGS. 4A and 4B illustrate diagrams of exemplary timings for calculating a distance between a cell and a UE based on RTT as taught herein.

FIG. 4A is a diagram 400 showing exemplary steps and timing to calculate a distance between a transmitter and a receiver through determining an RTT between them. In this particular instance, it is assumed that the transmitter is a gNB (or more specifically, a cell or TRP of a gNB) and the receiver is a UE. However, the opposite may be true, and the transmitter may be the UE and the receiver the gNB. The distance may be calculated by the gNB and/or by a location server in the network. Thus, the procedure may be referred to as "network centric" or "network based."

The procedure illustrated in FIG. 4A is per cell/TRP. In a multi-RTT positioning procedure, the basic procedure is repeatedly performed between the UE and multiple gNBs (or more specifically, different cells/TRPs of different gNBs). The basic network centric procedure is as follows:

1. The gNB transmits a downlink (DL) reference signal (RS) at time $T_1$;
2. The UE measures the time of arrival (TOA) of the DL RS at time $T_2$;
3. The UE transmits an uplink (UL) RS at time $T_3$ and a report of the difference between the reception time of the DL RS and the transmission time of the UL RS ($T_{Rx \rightarrow Tx} = T_3 - T_2$);
4. The gNB measures the TOA of the UL RS at time $T_4$ and determines the difference between the transmission time of the DL RS and the reception time of the UL RS ($T_{Tx \rightarrow Rx} = T_4 - T_1$);
5. The gNB calculates the distance from the UE and/or provides the measurements to the location server.

The distance d that the gNB and/or the location server calculates may be expressed as:

$$d = \frac{1}{2c}(T_{Tx \to Rx} - T_{Rx \to Tx}) = \frac{1}{2c}(T_4 - T_1) - \frac{1}{2c}(T_3 - T_2), \quad (1)$$

where c is the speed of light.

Figure 4B:
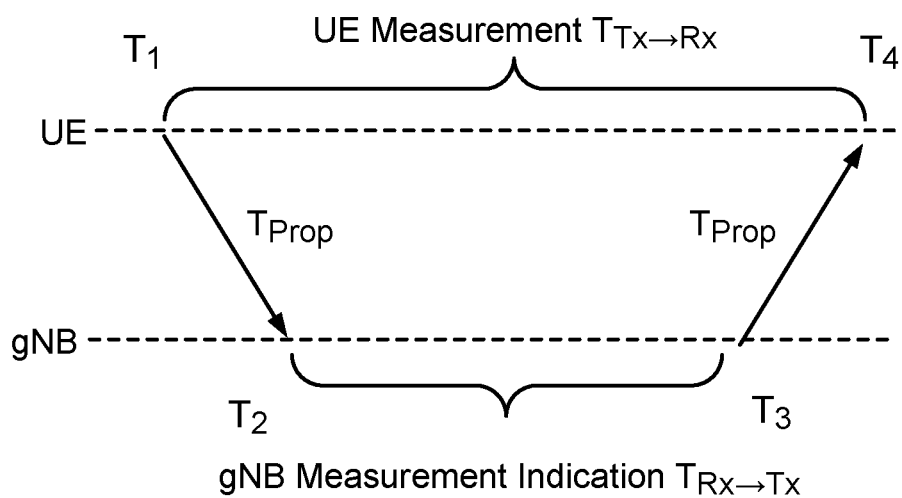

FIG. 4B is a diagram 450 showing exemplary steps and timing for calculating a distance between a cell/TRP of a gNB and a UE in which the roles are reversed (i.e., the UE is the transmitter and the gNB is the receiver). In this instance, the distance is calculated by the UE. Thus, the procedure may be referred to "UE centric" or "UE based." The procedure illustrated is per cell/TRP. In a multi-RTT positioning procedure, the basic procedure is repeatedly performed between the UE and multiple gNBs. The basic UE centric procedure is as follows:

1. The UE transmits an UL RS at time $T_1$;
2. The gNB measures the TOA of the UL RS at time $T_2$;
3. The gNB transmits a DL RS at time $T_3$ and a report of the difference between the reception time of the UL RS and the transmission time of the DL RS ($T_{Rx \to Tx} = T_3 - T_2$);
4. The UE measures the TOA of the DL RS at time $T_4$ and determines the difference between the transmission time of the DL RS and the reception time of the UL RS ($T_{Tx \to Rx} = T_4 - T_1$);
5. The UE calculates the distance to the gNB.

The UE may calculate the distance d using equation (1) above.

In a multi-RTT procedure, a basic RTT (network centric and/or UE centric) procedure is repeated across multiple cells/TRPs. In the basic RTT procedure, the positions of the gNBs are assumed to be known. Distances from the UE to the gNBs along with locations of the gNBs are used for multi-lateral positioning. A minimum of three gNBs are necessary to narrow the UE position to a single location in two dimensions (intersection of three hyperbolas), and a minimum of four gNBs are necessary in three dimensions (intersection of four hyperboloids). Additional gNBs, while not strictly necessary, can increase the accuracy.

One way for a UE to obtain the RTT measurements for multiple cells/TRPs is for the UE to associate with (or "attach" to) each cell and perform the RTT procedure as in FIGS. 5A and 5B. Unfortunately, associating with multiple different cells comes with some cost. Some of the costs are as follows:

Ongoing communication with an already associated cell/TRP can be disrupted;
The association process can introduce a large delay that may affect the timeliness of the positioning procedure;
Associating with multiple cells/TRPs can increase power consumption of the UE.

Alternatively, the UE can send all the reports corresponding to the other cells/TRPs, i.e., all ($T_3-T_2$), to one serving cell/TRP. The serving cell/TRP can forward the UE reports ($T_3-T_2$) to other cells/TRPs or may receive cell/TRP reports ($T_4-T_1$) from other cells/TRPs. This also introduces delays in the positioning procedure.

Accordingly, a mechanism is proposed in which the UE can measure the RTT to multiple gNBs without incurring the costs of association with the cells/TRPs, and/or without incurring the delays of forwarding the measurement reports. The mechanism broadly involves utilizing a lightweight positioning random access channel (RACH) procedure with each involved gNB to obtain the associated RTT measurement.

Figure 5:
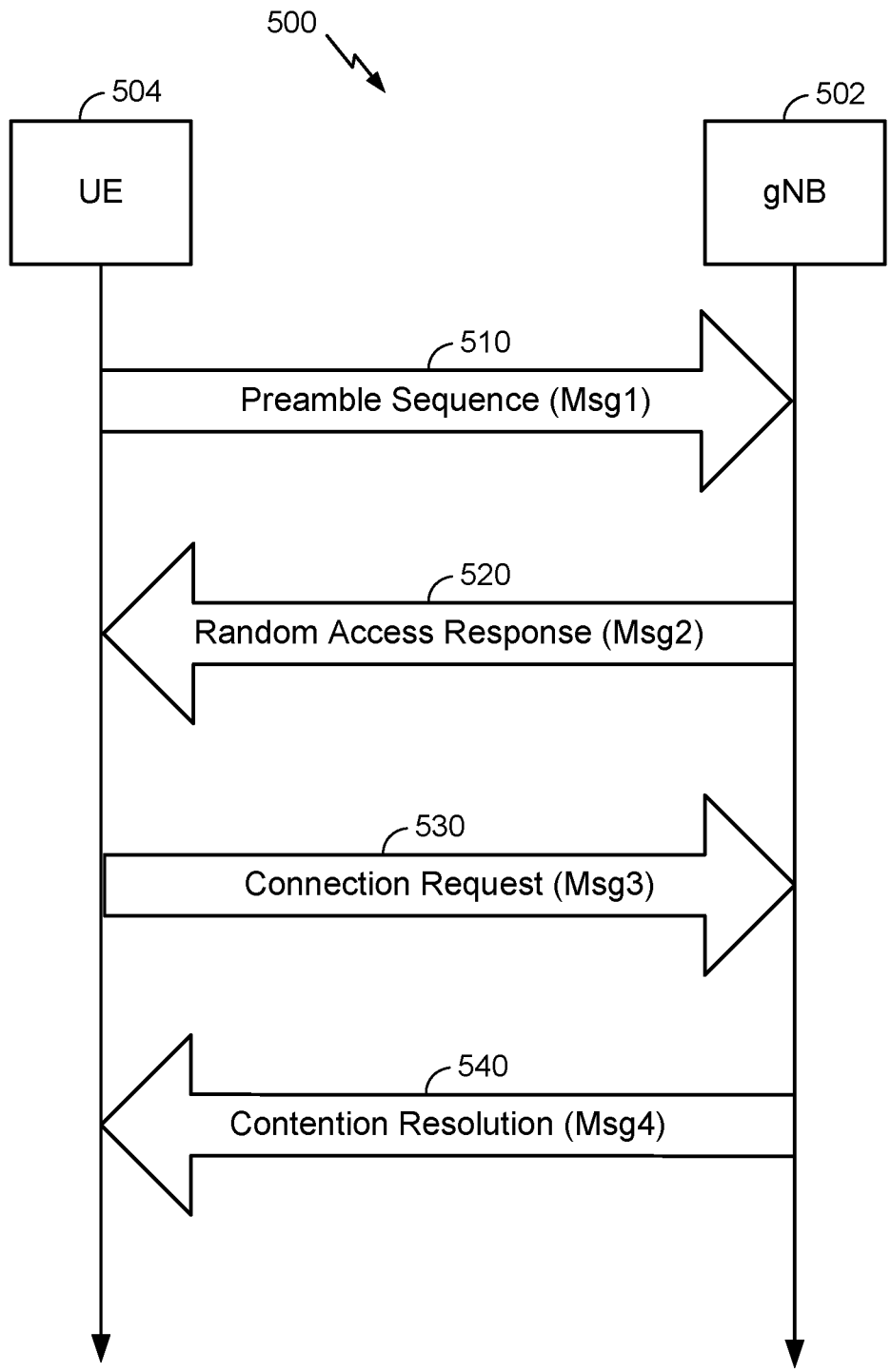
FIG. 5 illustrates an exemplary random access procedure, according to aspects of the disclosure.

FIG. 5 illustrates an exemplary random access procedure 500, according to aspects of the disclosure. The random access procedure 500 is performed between a UE 504 and a base station 502 (illustrated as a gNB), which may correspond to any of the UEs and base stations, respectively, described herein.

When a UE, such as UE 504, attempts to connect to the network for the first time (e.g., after being powered on, or after receiving a paging message while in the idle state), the UE performs a synchronization process during which it tunes to each frequency that it supports and determines whether that frequency belongs to the correct operator (e.g., Verizon®, AT&T®, etc.). Once synchronized, the UE reads the MIB and SIBs (broadcasted by each base station in the network) to determine whether it has selected the right public land mobile network (PLMN). If the PLMN is correct, the UE reads the SIB1 and SIB2 for the network (again, broadcasted by each base station in the network). The next step is referred to as the random access procedure.

At this point, the UE does not have any resources or channels available to inform the network about its desire to connect, so it sends the request over the shared medium. There are two possibilities at this stage, either contention-based random access or contention-free random access. In contention-based random access, any UE in the same area (same cell) sends the same request, in which case there is a possibility of collision among the requests from the various UEs. In contention-free random access, the network can instruct a UE to use some unique identity to prevent its request from colliding with requests from other UEs. FIG. 5 illustrates a contention-based random access procedure.

When the UE sends the very first message of the random access procedure to the network, it sends a specific pattern called an RACH preamble. The RACH preamble differentiates requests from different UEs. However, if two UEs use the same RACH preamble at the same time, then there can be a collision. There are a total of 64 such patterns available to a UE, and, for contention-based random access, the UE chooses one of them randomly. For contention-free random access, however, the network instructs the UE about which one to use.

Referring now to FIG. 5, at 510, the UE 504 selects one of 64 RACH preambles to send to the base station 502 as a RACH request. This message is referred to as "Message 1" (Msg1) or "Message A" (MsgA). The UE 504 also needs to provide its identity to the network (via base station 502) so that the network can address it in the next step. This identity is called the random access radio network temporary identity (RA-RNTI) and is determined from the time slot in which the RACH preamble is sent. If the UE 504 does not receive any response from the network within some period of time, it increases its transmission power in a fixed step and sends the RACH preamble/Msg1 again.

At 520, the base station 502 sends a random access response (RAR) to the UE 504, referred to as a "Message 2" (Msg2) or "Message B" (MsgB). The RAR is sent on the downlink shared channel (DL-SCH) and is addressed to the RA-RNTI calculated from the time slot in which the preamble was sent. The RAR carries following information: a cell-radio network temporary identifier (C-RNTI), a timing advance (TA) value, and an uplink grant resource. The base station 502 assigns the C-RNTI to the UE 504 to enable further communication with the UE 504. The TA value specifies how much the UE 504 should change its timing to compensate for the round-trip delay between the UE 504 and the base station 502. The uplink grant resource indicates the initial resources the UE 504 can use on the uplink shared channel (UL-SCH).

At 530, using allocated UL-SCH, the UE 504 sends an RRC connection request message, referred to as a "Message 3" (Msg3) or "Message C" (MsgC), to the base station 502. The UE 504 identifies itself by the C-RNTI assigned in the previous step. The message contains the UE's 504 identity and connection establishment cause. The UE's 504 identity is either a temporary mobile subscriber identity (TMSI) or a random value. A TMSI is used if the UE 504 has previously connected to the same network. The UE 504 is identified in the core network by the TMSI. A random value is used if the UE 504 is connecting to the network for the very first time. The reason for the random value or TMSI is that the C-RNTI may have been assigned to more than one UE in the previous step, due to multiple requests arriving at the same time. The connection establishment cause indicates the reason why the UE 504 needs to connect to the network, and will be described further below.

At 540, if the Msg3 was successfully received, the base station 502 responds with a contention resolution message, referred to as a "Message 4" (Msg4) or "Message D" (MsgD). This message is addressed to the TMSI or random value (from the Msg3) but contains a new C-RNTI that will be used for further communication.

Figure 6:
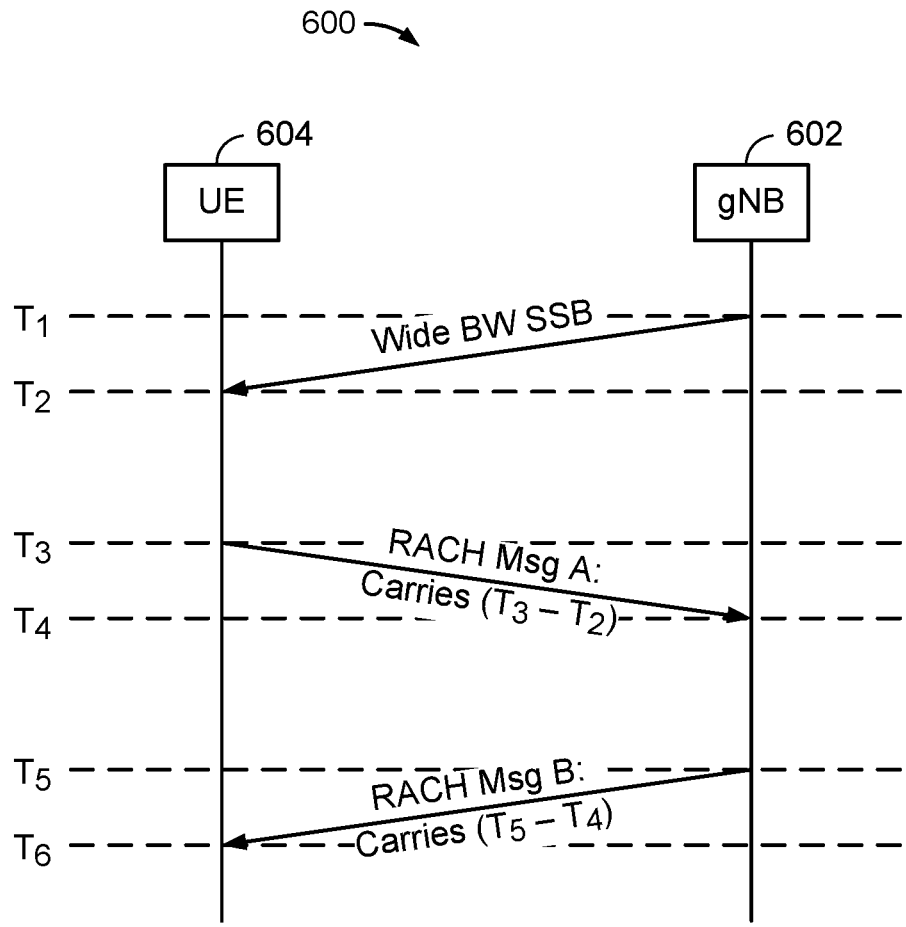
FIG. 6 illustrates a timing diagram of a proposed lightweight positioning RACH procedure to obtain an RTT measurement procedure as taught herein.

FIG. 6 illustrates an exemplary positioning RACH procedure 600, according to aspects of the disclosure. The positioning RACH procedure 600 includes the following operations. First, the gNB 602 transmits a wide bandwidth (BW) synchronization signal block (SSB) at time $T_1$ and the UE 604 measures the ToA of the wide bandwidth SSB at time $T_2$. As is known in the art, the wide bandwidth improves the TOA measurement resolution of the SSB.

Second, the UE 604 transmits a positioning Message A of the positioning RACH procedure at time $T_3$, together with a payload that contains an uplink time difference between reception at the UE of the SSB and transmission of the positioning Message A ($T_{Rx \to Tx}^{UE} = (T_3 - T_2)$), and the gNB 602 measures the arrival of the positioning Message A at time $T_4$. The bandwidth of the positioning Message A can also be wider to improve the TOA measurement resolution of the positioning Message A. Alternatively, the positioning Message A can comprise multiple different narrow bandwidth messages effectively simulating a wide bandwidth positioning Message A to improve the TOA measurement resolution.

Third, the gNB 602 transmits a wide bandwidth positioning Message B of the positioning RACH procedure at time $T_5$, together with a payload that contains a downlink time difference between reception of the positioning Message A and transmission of the positioning Message B ($T_{Rx \to Tx}^{gNB} = (T_5 - T_4)$), and the UE 604 measures the arrival of the positioning Message B at time $T_6$. As will be appreciated, the wider bandwidth improves the measurement resolution of the TOA of the positioning Message B.

The gNB 602 can determine the difference between the transmission time of the SSB and the reception time of the positioning Message A ($T_{Tx \to Rx}^{gNB} = (T_4 - T_1)$) and estimate the RTT as:

$$RTT = T_{Tx \to Rx}^{gNB} - T_{Rx \to Tx}^{UE} = (T_4 - T_1) - (T_3 - T_2). \quad (2)$$

Similarly, the UE 604 can determine the difference between the transmission time of the positioning Message A and the reception time of the positioning Message B ($T_{Tx \to Rx}^{UE} = (T_6 - T_3)$) and estimate the RTT as:

$$RTT = T_{Tx \to Rx}^{UE} - T_{Rx \to Tx}^{gNB} = (T_6 - T_3) - (T_5 - T_4). \quad (3)$$

In an aspect, the positioning Message A transmitted from the UE 604 may also be a wide bandwidth signal. The reason is that when a signal has a wide bandwidth, the timing resolution of the TOA measurement of the signal correspondingly improves. Therefore, when the UE 604 transmits a wide bandwidth positioning Message A, the gNB 602 may accurately measure the TOA of the positioning Message A. However, not all UEs are capable of transmitting a wide bandwidth signal. Also, in some instances, the instantaneous transmission power of the UE 604 may be limited. Therefore, in another aspect, the UE 604 may "simulate" a wide bandwidth positioning Message A by transmitting multiple narrow bandwidth signals, as briefly mentioned above. The frequency bands of the narrow bandwidth signals should be different from each other. Such multiple narrow bandwidth signals also have the effect of increasing the accuracy of the TOA measurements.

In an aspect, the SSB and the positioning Message B transmitted from the gNB 602 are both wide bandwidth signals. These are wide bandwidth signals so that the TOA measurement resolutions of these signals improved, i.e., the UE 604 may accurately measure the TOA of the SSB and the positioning Message B when wide bandwidths are used. In another aspect, that the SSB and/or the positioning Message B can be transmitted as multiple narrow bandwidth signals. Since power is usually not an issue with gNBs, however, it is expected that the SSB and the positioning Message B will be wide bandwidth signals.

Generally, the positioning RACH procedure described herein may be configured differently from the conventional RACH procedure used for the purpose of initiating communication. To distinguish from a conventional communication RACH procedure, as described above with reference to FIG. 5, signals related to the proposed positioning RACH procedure will be prefaced herein with the term "positioning." The positioning RACH procedure may be configured differently from a conventional communication RACH procedure in at least the following ways.

It can be assumed that a cell/TRP broadcasts SSBs for both RACH procedures—a positioning SSB for the positioning RACH procedure and a communication SSB for the conventional communication RACH procedure. However, the bandwidths of these SSBs may be different. Specifically, the bandwidth of the positioning SSB may be wider than for the communication SSB. As discussed above, the bandwidth of the positioning SSB can be configured to be wider to improve the resolution of the timing measurements (e.g., larger bandwidths than a downlink/uplink RACH signals in a conventional RACH procedure for initiating communication).

It can also be assumed that the cell/TRP broadcasts corresponding positioning configuration and communication configuration information. In an aspect, these may be broadcasted as SIB1 messages. The positioning configuration and the communication configuration define different resources for use by the UE. In the positioning RACH procedure, the UE responds to the cell/TRP with resources defined for the purpose of positioning when UE positioning is performed. For example, the positioning configuration may allocate resources to be used by the UE for transmitting a positioning Message A that is different (e.g., time, frequency, code) from the resources defined in the communication configuration for use by the UE to initiate communication. For example, the positioning Message A may have a wider bandwidth than the bandwidth of the resources allocated in communication configuration to request communication connection. Again, wider bandwidth improves timing measurement resolution.

As another example, instead of allocating a wide bandwidth positioning Message A, the positioning configuration may allocate multiple narrow bandwidth signals (with different frequency bands) for the positioning Message A. Multiple bandwidths also improve timing measurement resolution. It is of course contemplated that the positioning SSB and/or the positioning Message B can be transmitted as multiple narrow bandwidth signals. However, wide bandwidth signals are more likely to be used since power is typically not an issue with base stations.

As another example difference in the positioning RACH configuration, the positioning Message A and/or the positioning Message B can be configured to carry the time difference between the reception of the incoming signal (the positioning SSB for the UE, the positioning Message A for the cell/TRP) and the transmission of the response signal (the positioning Message A for the UE, the positioning Message B for the cell/TRP). As a further example, as compared to the timing advance value in the conventional RACH procedure, the time difference sent in the positioning Message B can be of a higher resolution to improve the accuracy of the position estimate. Correspondingly, the size of the positioning Message B may be provisioned to be larger in order to accommodate the higher resolution time difference value.

Figure 7:
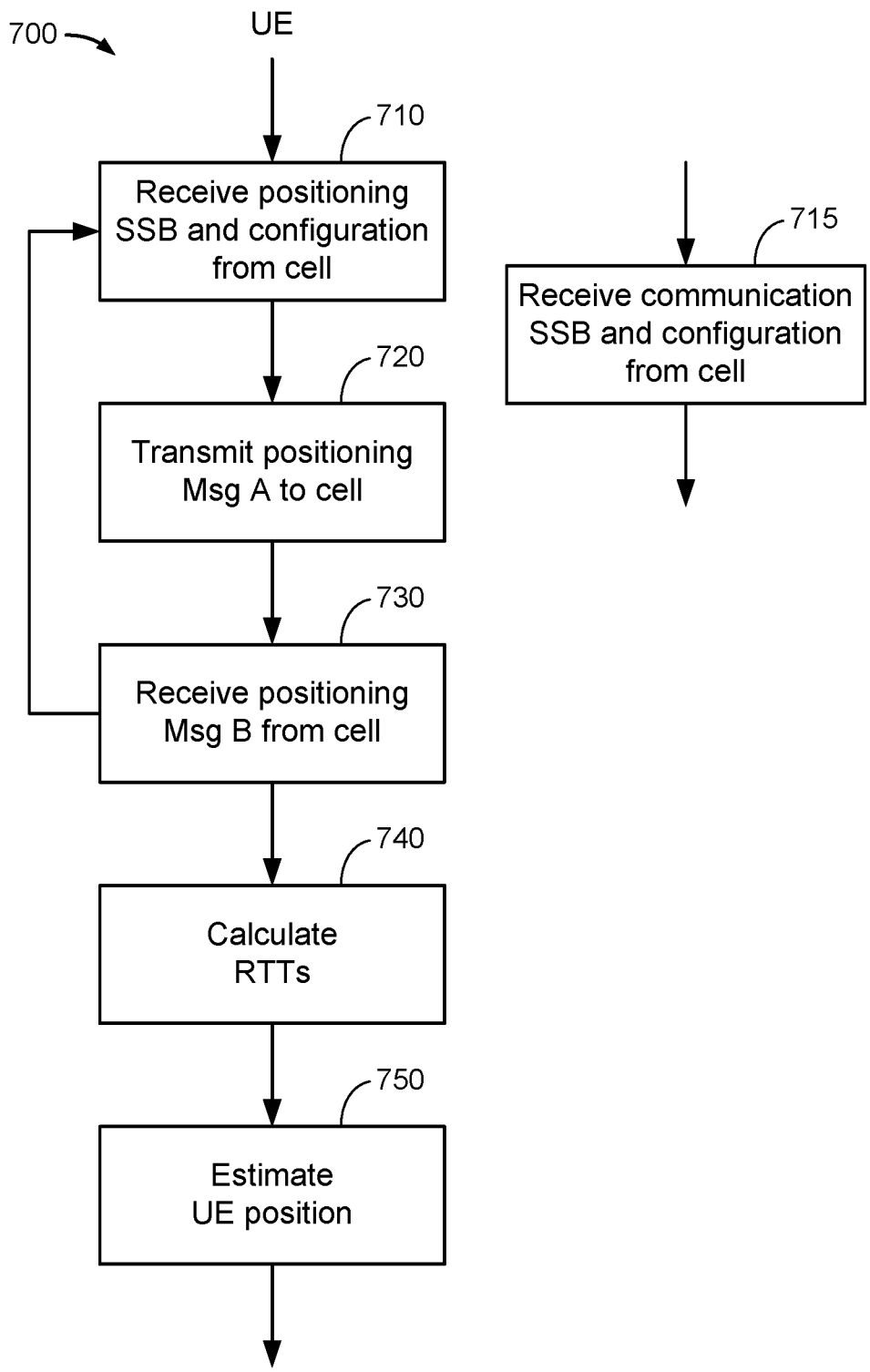
FIG. 7 illustrates an exemplary method performed by a UE to implement the positioning RACH process of FIG. 6 as taught herein.

FIG. 7 illustrates an exemplary method 700 performed by a UE (e.g., any of the UEs described herein) to implement a positioning RACH procedure, according to aspects of the disclosure. At block 710, the UE receives a positioning SSB broadcasted from a cell/TRP at a first time (e.g., time $T_2$ in FIG. 6). The UE also receives a positioning configuration at block 710. It should be noted that the UE may also be capable of performing the conventional communication RACH procedure. To illustrate, at block 715, the UE can also receive a conventional communication SSB and communication configuration. For conciseness, the remainder of the conventional RACH procedure is not shown. In an aspect, blocks 710 and 715 may be performed by the WWAN transceiver 310 (specifically receiver(s) 312), the processing system 332, the memory 340, and/or the RTT positioning module 342, any or all of which may be referred to as means for performing this block.

In block 710, the cell/TRP can be a serving cell/TRP or a non-serving cell/TRP. If the UE is not currently associated with a cell/TRP (i.e., did not yet go through the conventional communication RACH procedure), the cell/TRP would be a non-serving cell/TRP. In an aspect, the bandwidth of the positioning SSB may be wider such that the TOA measurement resolution of the positioning SSB at the UE is higher than a TOA measurement resolution threshold. Small measurement resolutions enable more accurate measurements, i.e., the SSB arrival time (e.g., $T_2$) can be accurately measured. The wide bandwidth positioning SSB can be used as the DL signal measured by the UE in network centric positioning.

An example of the TOA measurement resolution threshold is a cycle prefix (CP) duration, e.g., of the positioning SSB. Another example is a symbol duration. Yet another is that the TOA measurement resolution threshold can be specified to be some multiple of a time-sampling duration. Note that the CP and the symbol durations can depend on the numerology of the RAT in which the UE and cell/TRP are operating. Therefore, a fixed time scale duration may be specified for the TOA measurement resolution threshold, such as 1 ns, 0.2 ns, and so on. Since measurement accuracy in positioning is important, the TOA measurement resolution threshold can be specified to be resolvable within some fixed distance. For example, the TOA measurement resolution threshold can be set such that the error is less than 10 m, 1 m, and even to sub meter lengths.

At block 720, in response to the positioning SSB, the UE transmits a positioning Message A to the cell/TRP at a second time (e.g., time $T_3$ in FIG. 6). The uplink resources for the positioning Message A are configured in the positioning configuration received at block 710. The positioning configuration defines resources that are different from the communication configuration. In this way, the cell/TRP is able to determine that the positioning Message A is for positioning purposes, and not for establishing communication with the cell/TRP. In an aspect, block 720 may be performed by the WWAN transceiver 310 (specifically transmitter(s) 314), the processing system 332, the memory 340, and/or the RTT positioning module 342, any or all of which may be referred to as means for performing this block.

The positioning Message A may be such that the TOA measurement resolution is also higher than the TOA measurement threshold. One way to achieve this is for the UE to transmit the positioning Message A as a wide bandwidth signal. However, the UE may not be capable of transmitting a sufficiently wide bandwidth signal. Even if the UE is capable, transmitting wide bandwidth signals consumes more power. Thus, alternatively, the positioning Message A can be sent as multiple narrow bandwidth signals. The frequency bands of the multiple narrow bandwidth signals should be different such that they aggregate to cover a wide bandwidth. In an aspect, the number of the multiple narrow bandwidth signals may be sufficient such that the measurement resolution of the positioning Message A is higher than the TOA measurement resolution threshold.

In an aspect, the positioning Message A may include an uplink time difference between the first time and the second time (e.g., $(T_3-T_2)$ in FIG. 6). This is useful in network centric positioning (see e.g., equation (2)). More specifically, an uplink time difference field in the payload of the positioning Message A carries the uplink time difference between the first time and the second time (e.g., $(T_3-T_2)$ in FIG. 6). In an aspect, the uplink time difference field of the positioning Message A is sufficiently large to accommodate the TOA measurement resolution threshold and an expected range of the uplink time difference values. For example, the uplink time difference may be expected to range between 0 and 131.072 μs with a resolution of 2 ns between each successive bit values, in which case, a total of 16 bits would be needed for the uplink time difference field.

The positioning Message A with the uplink time difference field can be used as the return uplink signal measured by the cell/TRP in the network centric positioning procedure. The positioning Message A with or without the uplink time difference field can be used as the uplink signal measured by the cell in the UE centric positioning.

Subsequent to transmitting the positioning Message A to the cell/TRP, at block 730, the UE receives a positioning Message B from the cell/TRP at a third time (e.g., time $T_6$ in FIG. 6). If only the network centric positioning procedure is being performed, block 730 is optional. On the other hand, if a UE centric positioning procedure is being performed, the bandwidth of the positioning Message B may be wider such that the TOA measurement resolution of the positioning Message B at the UE is higher than the TOA measurement resolution threshold. In an aspect, block 730 may be performed by the WWAN transceiver 310 (specifically receiver (s) 312), the processing system 332, the memory 340, and/or the RTT positioning module 342, any or all of which may be referred to as means for performing this block.

In an aspect, the positioning Message B includes a downlink time difference between the reception time at the cell/TRP of the positioning Message A and the transmission time from the cell/TRP of the positioning Message B (e.g., $(T_5-T_4)$ in FIG. 6). This is useful in the UE centric positioning procedure (see e.g., equation (3)). More specifically, a downlink time difference field in a payload of the positioning message B carries the downlink time difference (e.g., $(T_5-T_4)$ in FIG. 6). In an aspect, the downlink time difference field of the positioning Message B is sufficiently large to accommodate the TOA measurement resolution threshold and an expected range of the downlink time difference values. The positioning Message B with the downlink time difference field can be used as the return downlink signal measured by the UE in the UE centric positioning procedure.

If UE centric positioning is to be performed, then the UE performs blocks 710, 720, and 730 with multiple cells/TRPs. In an aspect, not all cells/TRPs of the multiple cells/TRPs are serving cells/TRPs. That is, at least one cell/TRP can be a non-serving cell/TRP. At block 740, the UE also calculates the RTTs between the UE and each of the cells/TRPs. The RTT between the UE and each cell/TRP can be calculated based on equation (3) above. At block 750, the UE can estimate its position based on the multiple RTTs. In an aspect, blocks 740 and 750 may be performed by the WWAN transceiver 310, the processing system 332, the memory 340, and/or the RTT positioning module 342, any or all of which may be referred to as means for performing this block.

Regardless of whether or not the UE centric positioning is performed, the UE can still perform blocks 710, 720, and 730 with multiple cells/TRPs. Again, some of the cells/TRPs can be non-serving cells/TRPs. If a network centric positioning procedure is being performed, the UE would not necessarily perform blocks 730, 740, and 750.

Figure 8:
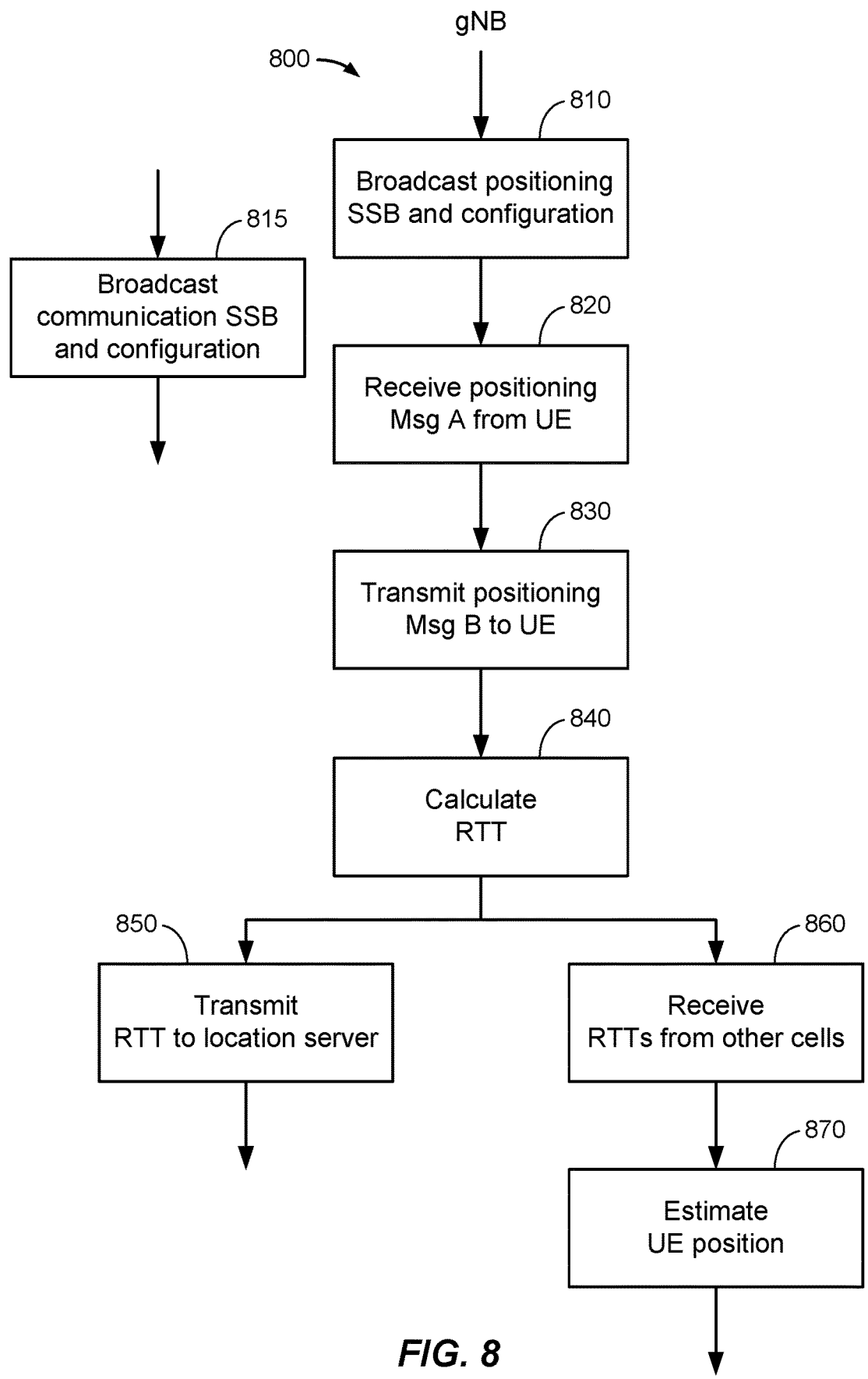
FIG. 8 illustrates an exemplary method performed by a cell to implement the positioning RACH process of FIG. 6 as taught herein.

FIG. 8 illustrates an exemplary method 800 performed by a cell/TRP (e.g., a cell/TRP of any of the base stations described herein) to implement a positioning RACH procedure, according to aspects of the disclosure. At block 810, the cell/TRP broadcasts a positioning SSB at a first time (e.g., time $T_1$ in FIG. 6). The cell/TRP also broadcasts the positioning configuration at block 810. The cell/TRP can be a serving cell/TRP or a non-serving cell/TRP for the UE. It should be noted that the cell/TRP is also capable of performing the conventional communication RACH procedure. To illustrate, at block 815, the cell/TRP can also broadcast the conventional communication SSB and the communication configuration. For conciseness, the rest of the conventional RACH procedure is not shown. In an aspect, blocks 810 and 815 may be performed by the WWAN transceiver 350 (specifically transmitter(s) 354), the processing system 384, the memory 386, and/or the RTT positioning module 388, any or all of which may be referred to as means for performing this block.

In block 810, the bandwidth of the positioning SSB may be wider such that the TOA measurement resolution of the positioning SSB at the UE is higher than a TOA measurement resolution threshold. The wide bandwidth positioning SSB can be used as the downlink signal measured by the UE in network centric positioning.

At block 820, the cell/TRP receives a positioning Message A from the UE at a second time (e.g., time $T_4$ in FIG. 6). The positioning Message A may be such that the TOA measurement resolution is also higher than the TOA measurement threshold. The positioning Message A may be received as a wide bandwidth signal. Alternatively, the positioning Message A may be received as multiple narrow bandwidth signals. The frequency bands of the multiple narrow bandwidth signals may be different such that they aggregate to cover a wide bandwidth. In an aspect, the number of the multiple narrow bandwidth signals should be such that the measurement resolution of the positioning Message A is higher than the TOA measurement resolution threshold. In an aspect, block 820 may be performed by the WWAN transceiver 350 (specifically receiver(s) 352), the processing system 384, the memory 386, and/or the RTT positioning module 388, any or all of which may be referred to as means for performing this block.

In an aspect, the positioning Message A includes an uplink time difference between the reception time at the UE of the SSB and the transmission time from the UE of the positioning message A (e.g., $(T_3-T_2)$ in FIG. 6). This is useful in network centric positioning. As indicated above, the uplink time difference field in a payload of the positioning Message A carries the uplink time difference (e.g., $(T_3-T_2)$ in FIG. 6). Also, the uplink time difference field of the positioning Message A is sufficiently large to accommodate the TOA measurement resolution threshold and an expected range of the uplink time difference values.

The positioning Message A with the uplink time difference field can be used as the return uplink signal measured by the cell/TRP in the network centric positioning procedure. The positioning Message A with or without the uplink time difference field can be used as the uplink signal measured by the cell/TRP in the UE centric positioning procedure.

Subsequent to receiving the positioning Message A from the UE, at block 830, the cell/TRP transmits the positioning Message B to the cell/TRP at a third time (e.g., time $T_5$ in FIG. 6). If only the network centric positioning procedure is being performed, block 830 can be optional. On the other hand, if the UE centric positioning procedure is being performed, the bandwidth of the positioning Message B may be wide such that the TOA measurement resolution of the positioning Message B at the UE is higher than the TOA measurement resolution threshold. In an aspect, blocks 830 may be performed by the WWAN transceiver 350 (specifically transmitter(s) 354), the processing system 384, the memory 386, and/or the RTT positioning module 388, any or all of which may be referred to as means for performing this block.

In an aspect, the positioning Message B may include a downlink time difference between the transmission time from the cell/TRP of the positioning Message B and the reception time at the cell/TRP of the positioning Message A (e.g., $(T_5-T_4)$ in FIG. 6). This is useful in the UE centric positioning procedure. Again as indicated above, the downlink time difference field in a payload of the positioning Message B carries the downlink time difference. Also, the downlink time difference field of the positioning Message B is sufficiently large to accommodate the TOA measurement resolution threshold and an expected range of the downlink time difference values.

If the network centric positioning is to be performed, then at 840, the cell/TRP may calculate the RTT between it and the UE. This RTT can be calculated based on equation (2) above. If the cell/TRP is not designated to determine the position of the UE, then at 850, the cell/TRP may forward the calculated RTT to a designated positioning entity. The designated positioning entity may be another cell/TRP (e.g., a primary serving cell/TRP for the UE) or a location server of the network outside of the cells/TRPs (e.g., location server 230, LMF 270). In an aspect, blocks 840 and 850 may be performed by the WWAN transceiver 350, the processing system 384, the memory 386, and/or the RTT positioning module 388, any or all of which may be referred to as means for performing this block.

On the other hand, the cell/TRP may be designated as the location server for the UE. In this instance, at block 860, the cell/TRP may receive from one or more other cells/TRPs the respective RTTs between each of the other cells/TRPs and the UE. Then at 870, the cell/TRP can estimate the UE position based on the multiple RTTs. Note that not all of the one or more other cells/TRPs are serving cells/TRPs for the UE, i.e., at least one may be a non-serving cell/TRP.

Figure 9:
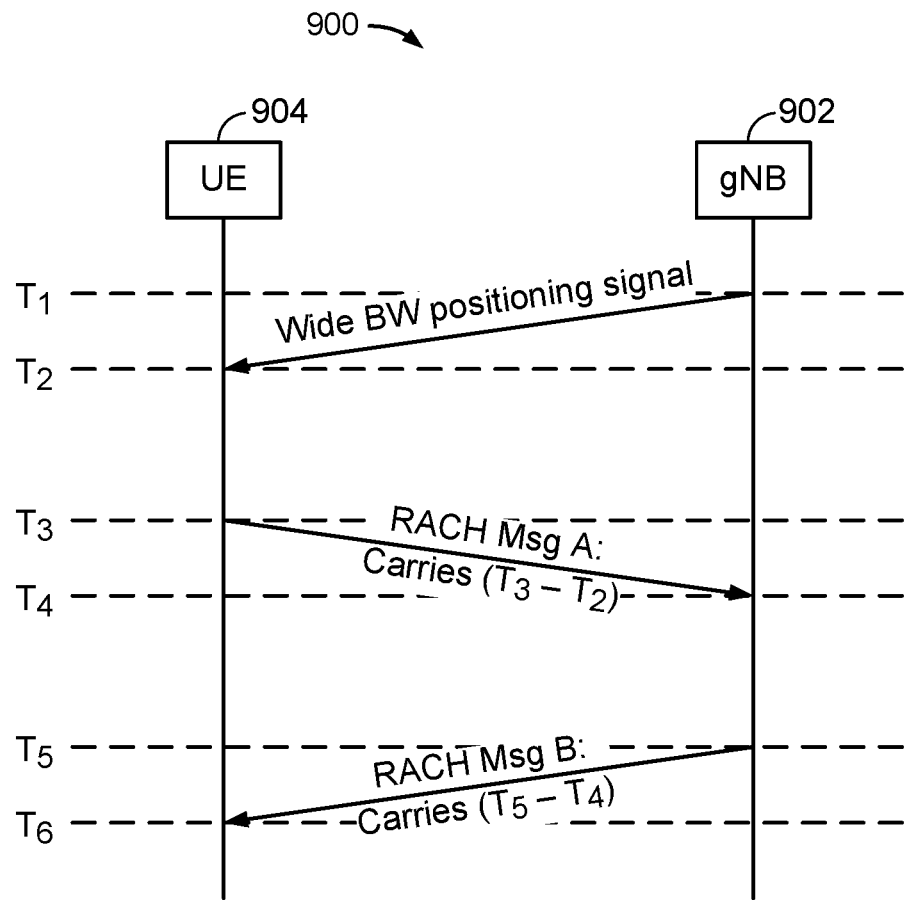
FIG. 9 illustrates a timing diagram of another proposed lightweight positioning RACH procedure to obtain an RTT measurement procedure as taught herein.

In addition to the positioning SSB, other downlink signals may be utilized. A positioning reference signal (PRS) is one example of such a downlink signal. In some instances, the bandwidth of the PRS may be just as wide or even wider than the positioning SSB. FIG. 9 illustrates an exemplary positioning RACH procedure 900, according to aspects of the disclosure. The positioning RACH procedure 900 includes the following operations.

First, a gNB 902 (e.g., any of the base stations described herein) transmits a positioning signal at time $T_1$ and a UE 604 measures the arrival of the positioning signal at time $T_2$. The positioning signal can be a wide bandwidth (BW) signal such as a PRS, a positioning SSB, or some other wide bandwidth downlink signal.

Second, the UE 604 transmits a positioning Message A of the positioning RACH procedure 900 at time $T_3$, together with a payload. The payload may include the uplink time difference $T_{RX \to Tx}^{UE}=(T_3-T_2)$ between the reception time at the UE 604 of the positioning signal and the transmission time from the UE 604 of the positioning Message A, and the gNB measures the arrival of the positioning Message A at time $T_4$. The payload may further include the positioning signal type (e.g., PRS, positioning SSB, etc.) used by the UE 604 to measure $T_2$, and, if necessary, identification (ID) of the positioning signal (e.g., ID of the PRS). To improve the TOA measurement resolution of the positioning Message A, the bandwidth of the positioning Message A can be wide to improve the TOA measurement resolution of the positioning Message A, or the positioning Message A can comprise multiple different narrow bandwidth messages effectively simulating a wide bandwidth signal to improve the TOA measurement resolution.

Third, the gNB 602 transmits a wide bandwidth positioning Message B of the positioning RACH procedure 900 at time $T_5$, together with a payload that may contain the downlink time difference $T_{Rx \to Tx}^{gNB}=(T_5-T_4)$ between the reception time at the gNB 602 of the positioning Message A and the transmission time from the gNB 602 of the positioning Message B. The UE 604 measures the arrival of the positioning Message B at time $T_6$.

As indicated, a gNB can determine $T_{Tx \to Rx}^{gNB})$ and estimate the RTT between it and the UE utilizing equation (2). Also, the UE can determine the $T_{Tx \to Rx}^{UE}=(T_6-T_3)$ and estimate the RTT between it and each cell/TRP utilizing equation (3).

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS) in 5G, tracking reference signals (TRS), cell-specific reference signals (CRS), channel state information reference signals (CSI-RS), primary synchronization signals (PSS), secondary synchronization signals (SSS), etc.

Figure 10:
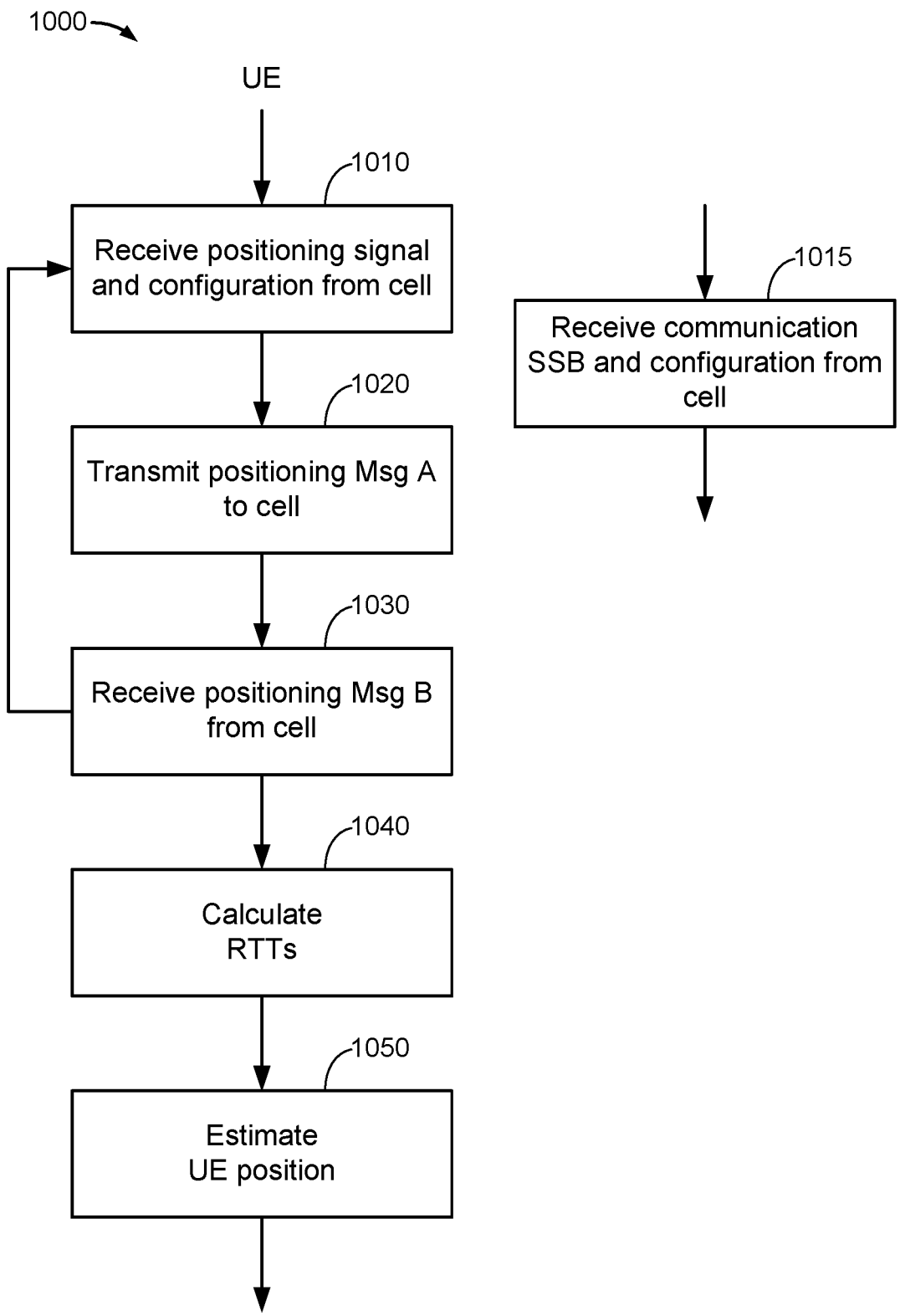
FIG. 10 illustrates an exemplary method performed by a UE to implement the positioning RACH process of FIG. 9 as taught herein.
Figure 11:
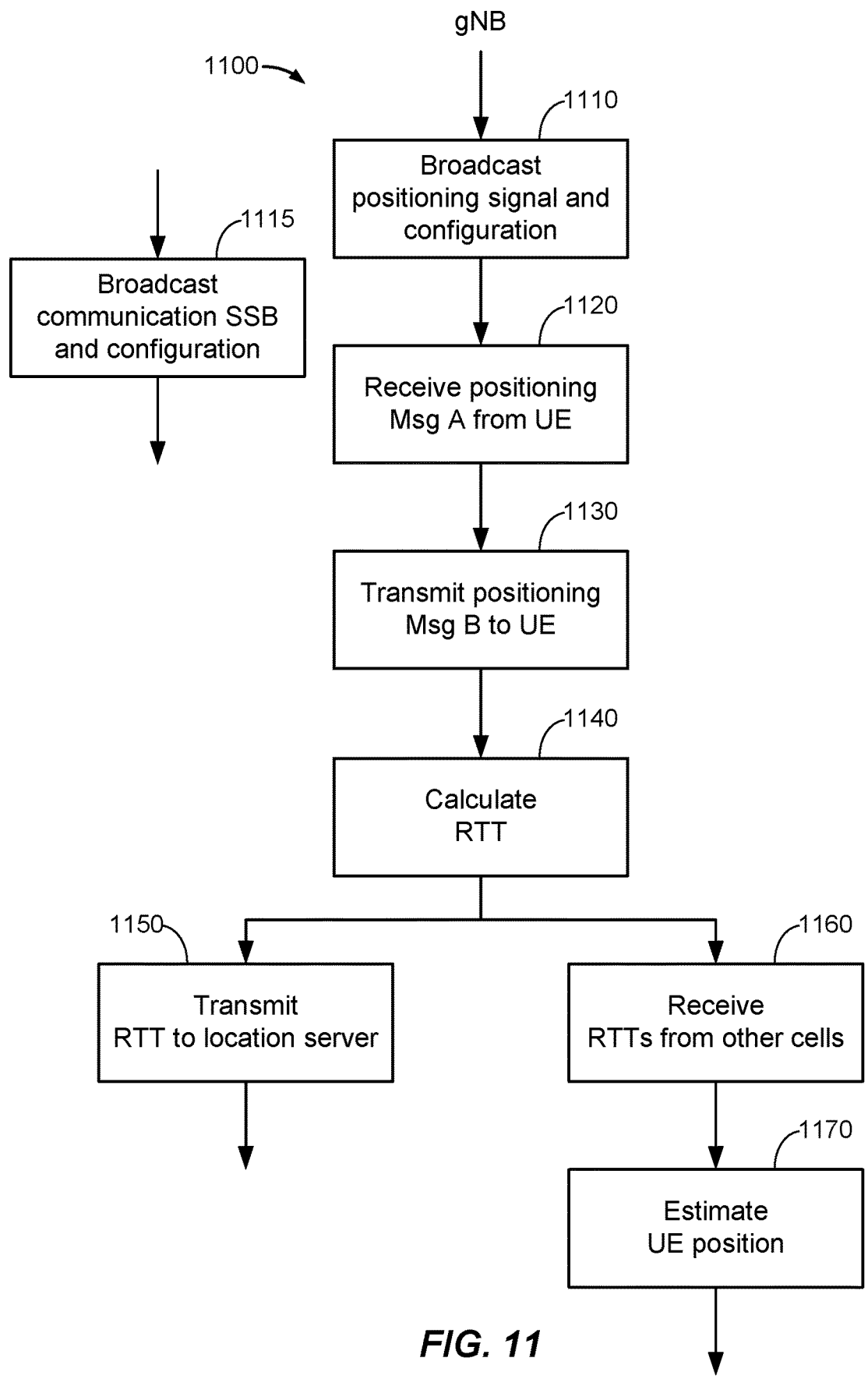
FIG. 11 illustrates an exemplary method performed by a cell/TRP to implement the positioning RACH process of FIG. 9 as taught herein.

FIG. 10 illustrates an exemplary method 1000 performed by a UE (e.g., any of the UEs described herein) and FIG. 11 illustrates an exemplary method 1100 performed by a cell/TRP (e.g., of any of the base stations described herein) to implement the positioning RACH procedure 900 of FIG. 9. The method 1000 of FIG. 10 is similar to the method 700 in FIG. 7, and the method 1100 of FIG. 11 is similar to the method 800 in FIG. 8. Therefore, detailed descriptions of FIGS. 10 and 11 will be omitted.

It should be noted, however, that FIGS. 10 and 11 are broader than FIGS. 7 and 8 in the following sense. In FIG. 11, the cell/TRP broadcasts the positioning signal at block 1110, and in FIG. 10, the UE receives a positioning signal at block 1010. As mentioned above, the positioning signal can be a positioning SSB as in FIGS. 7 and 8. But in FIGS. 10 and 11, the positioning signal can also be a PRS or other downlink positioning signal. In an aspect, block 1010 may be performed by the WWAN transceiver 310 (specifically receiver(s) 312), the processing system 332, the memory 340, and/or the RTT positioning module 342, any or all of which may be referred to as means for performing this block. In an aspect, block 1110 may be performed by the WWAN transceiver 350 (specifically transmitter(s) 354), the processing system 384, the memory 386, and/or the RTT positioning module 388, any or all of which may be referred to as means for performing this block.

Also in FIG. 10, the UE transmits the positioning Message A at block 1020, and in FIG. 11, the cell/TRP receives the positioning Message A at block 1120. The positioning Message A in these figures may include, in addition to the uplink time difference between the reception time at the UE of the positioning signal and the transmission time from the UE of the positioning Message A (e.g., $(T_3-T_2)$ in FIG. 9), the positioning signal type (e.g., whether it is the SSB, PRS, or other). Also, the positioning Message A may further include the identification of the positioning signal. For example, a base station may transmit multiple PRS signals (e.g., the base station may transmit multiple beams), each associated with a unique PRS identifier (PRS ID). By including the PRS ID in the positioning Message A, the base station will be able to determine the correct transmit time of the positioning signal (e.g., $T_1$ in FIG. 9). In an aspect, block 1020 may be performed by the WWAN transceiver 310 (specifically transmitter(s) 314), the processing system 332, the memory 340, and/or the RTT positioning module 342, any or all of which may be referred to as means for performing this block. In an aspect, block 1120 may be performed by the WWAN transceiver 350 (specifically receiver(s) 352), the processing system 384, the memory 386, and/or the RTT positioning module 388, any or all of which may be referred to as means for performing this block.

The remaining blocks of FIG. 10, i.e., blocks 1015 and 1030 to 1050, are similar to blocks 715 and 730 to 750 of FIG. 7. Likewise, the remaining blocks of FIG. 11, i.e., blocks 1115 and 1130 to 1170, are similar to blocks 815 and 830 to 870 of FIG. 8. As such, for the sake of brevity, these blocks are not described again here.

As mentioned above, RTTs between the UE and multiple cells/TRPs are necessary to narrow the UE position to a single location. The UE can still perform blocks 1010, 1020, and 1030 with multiple cells/TRPs so that multiple RTTs can be determined. Again, some of the cells/TRPs can be non-serving cells/TRPs.

Alternatively, the UE still may receive positioning signals from multiple cells/TRPs. But instead of responding to each cell/TRP with a positioning Message A to that cell/TRP, the UE may transmit one positioning Message A to a serving cell/TRP that carries multiple uplink time differences corresponding to the multiple cells/TRPs. Also, the UE may receive one positioning Message B from the cell/TRP that carries the multiple downlink time differences corresponding to multiple cells/TRPs.

Figure 12:
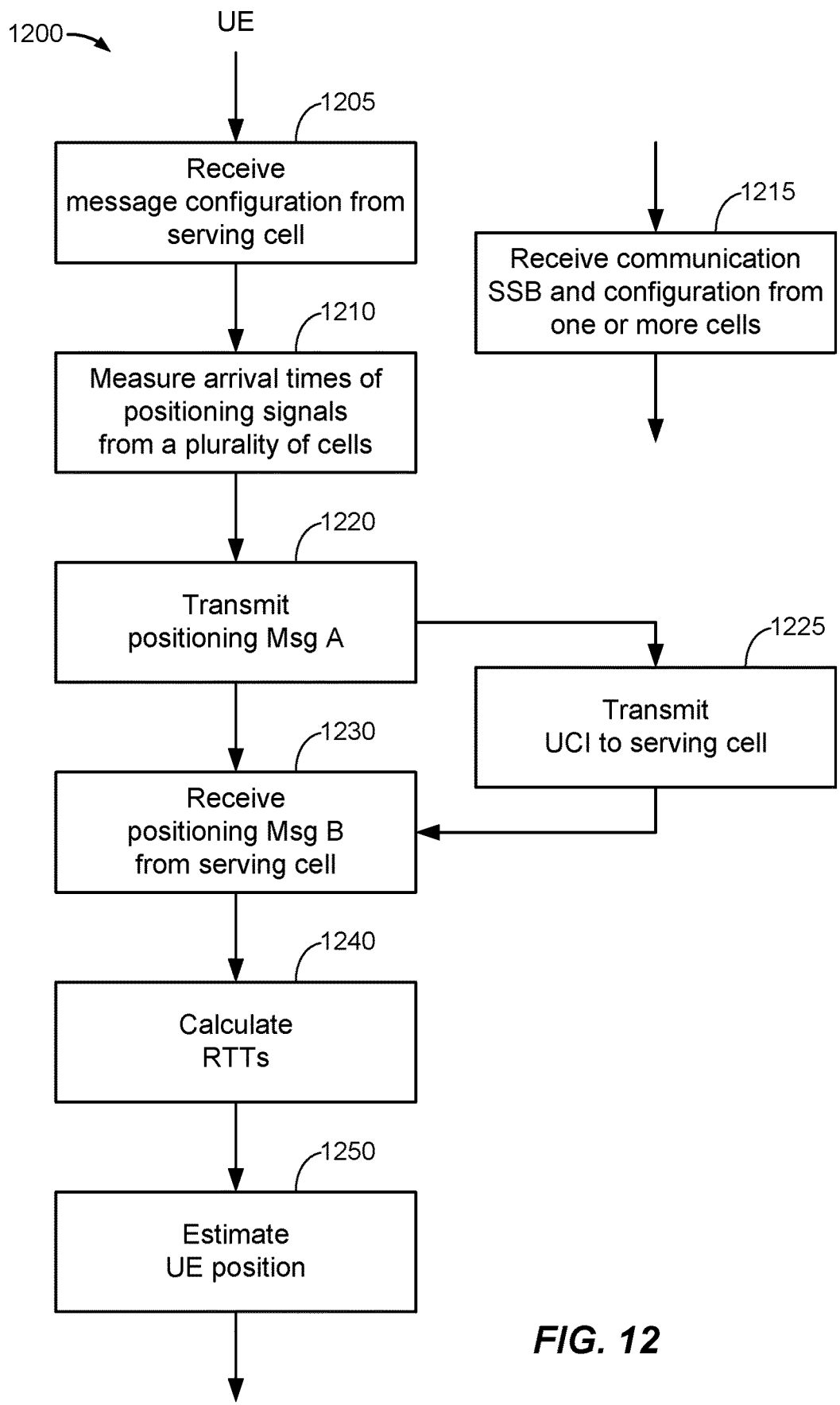
FIG. 12 illustrates another exemplary method performed by a UE to implement the positioning RACH process of FIG. 9 as taught herein.

FIG. 12 illustrates an exemplary method 1200 performed by a UE (e.g., any of the UEs described herein) to implement the positioning RACH procedure 900 of FIG. 9 in which a single positioning Message A is transmitted to the serving cell/TRP and a single positioning Message B is received from the serving cell/TRP. At block 1205, the UE receives a message configuration from the serving cell/TRP. The message configuration may define resources configured for use by the UE to send a message.

In one aspect, the message configuration may be a positioning configuration, which as indicated, defines resources that are different from a communication configuration. It should be noted that the UE may also receive a positioning configuration from other cells/TRPs as well, some of which the UE may be associated with and some of which the UE may not be associated. The UE may also be capable of performing a conventional communication RACH procedure. To illustrate, at block 1215, the UE also receives conventional communication SSBs and communication configurations from one or more cells/TRPs. In an aspect, blocks 1210 and 1215 may be performed by the WWAN transceiver 310 (specifically receiver(s) 312), the processing system 332, the memory 340, and/or the RTT positioning module 342, any or all of which may be referred to as means for performing this block.

However, it can be that the message configuration may define resources that can be used by the UE for multiple purposes, including for positioning purposes. The message configuration may be broadcasted as SIB-1 messages.

At block 1210, the UE receives a plurality of positioning signals broadcasted from a corresponding plurality of cells/TRPs, and measures a plurality of arrival times (e.g., $T_2$ in FIG. 9), one for each cell/TRP. One of the plurality of cells/TRPs may be the serving cell/TRP. The UE may or may not be associated with the other cells/TRPs. The positioning signal from each cell/TRP may be a PRS or a positioning SSB (SSB with a wide bandwidth). The bandwidths of the PRSs may be as wide or wider than that of the positioning SSB. Therefore, the arrival times (e.g., $T_2$ in FIG. 9) can be accurately measured.

At block 1220, the UE transmits a positioning Message A, as at time $T_3$ in FIG. 9. Unlike the situation in block 1020 of FIG. 10, in block 1220, one positioning Message A is transmitted. The positioning Message A includes multiple time differences between the reception time at the UE of each positioning signal and the transmission time from the UE of the positioning Message A (e.g., $T_{Rx \to Tx}^{UE} = (T_3 - T_2)$ in FIG. 9) in the payload. In one aspect, the positioning Message A is received by the plurality of cells/TRPs. Since only one positioning Message A is transmitted, the transmission time (e.g., $T_3$ in FIG. 9) is the same. Also, since the positioning Message A is received by the plurality of cells/TRPs, each cell/TRP can determine its corresponding arrival time (e.g., $T_4$ of FIG. 9) of the positioning Message A. In an aspect, block 1220 may be performed by the WWAN transceiver 310 (specifically transmitter(s) 314), the processing system 332, the memory 340, and/or the RTT positioning module 342, any or all of which may be referred to as means for performing this block.

In another aspect, the positioning Message A may be received only by the serving cell/TRP, which may then forward the relevant contents of the positioning Message A to the other cells/TRPs through a backhaul link (e.g., an X2 link). In this instance, the other cells/TRPs cannot directly measure their own TOA of the positioning Message A (e.g., $T_4$ in FIG. 9), but can still estimate the RTT between itself and the UE as follows. In effect, the serving cell/TRP can estimate $T_3 = T_4 - (RTT/2)$ Then, $T_2$ corresponding to the other cell/TRP can be found using $T_3$ and the differences $(T_3 - T_2)$ of the other cell/TRP. Subsequently, the RTT of the other cell/TRP may be calculated as $2*(T_2 - T_1)$ of the other cell/TRP.

The positioning Message A can also include a positioning signal type indicating which type of signal the UE used for positioning. That is, the UE can include in the positioning Message A whether it used a PRS (and which type of PRS) or a positioning SSB as the positioning signal to measure the arrival time $T_2$ for each cell/TRP. And if necessary, the positioning Message A can also include the ID of the positioning signal.

The uplink resources for the positioning Message A are configured in the message configuration received from the serving cell/TRP at block 1205. For example, the message configuration may be the positioning configuration that defines resources that are different from the communication configuration. In this instance, the serving cell/TRP will be able to determine that the positioning Message A is for positioning purposes, and not for establishing communication purposes. That is, the uplink resources of the positioning Message A may unambiguously inform the serving cell/TRP that the positioning Message A is for positioning purposes.

Alternatively or in addition thereto, at block 1225, the UE can explicitly indicate whether or not the positioning Message A is for positioning purposes. For example, the UE may indicate in uplink control information (UCI) to the serving cell/TRP whether the RACH procedure it initiated (e.g., by transmitting the positioning Message A) is for the purposes of positioning or for other purposes (e.g., for establishing a communication link with the serving cell/TRP). This can be useful in situations where the uplink resources defined in the message configuration can be used for multiple purposes. Note that even if the message configuration is the positioning configuration, and therefore the purpose is unambiguous, the UCI can still be transmitted.

At block 1230, the UE receives a positioning Message B from the serving cell/TRP, as at time $T_6$ of FIG. 9. The positioning Message B may carry multiple downlink time differences between the reception time at the cell/TRP of the positioning Message A and the transmission time from the cell/TRP of the positioning Message B (e.g., $(T_5 - T_4)$ in FIG. 9), one for each of the plurality of cells/TRPs. In this instance, since the UE does not necessarily receive the downlink time difference from each of the other cells/TRPs, the downlink time difference (e.g., $(T_5 - T_4)$ in FIG. 9) of a cell/TRP may be viewed as representing a delay between a reception time (e.g., $T_4$ in FIG. 9) of the positioning Message A at the other cell/TRP and the time (e.g., $T_5$ in FIG. 9) when the other cell/TRP would be ready to send a response signal to the UE. Alternately, the transmission time of the positioning Message B from the serving cell/TRP may be used as the reference time (e.g., $T_5$ of FIG. 9) for computing the time differences of other cells/TRPs also. In an aspect, block 1230 may be performed by the WWAN transceiver 310

(specifically receiver(s) 312), the processing system 332, the memory 340, and/or the RTT positioning module 342, any or all of which may be referred to as means for performing this block.

At block 1240, the UE calculates the RTTs between the UE and each of the cells/TRPs. The RTT between the UE and each cell/TRP can be calculated based on equation (3) above. At block 1250, the UE can estimate its position based on the multiple RTTs. If only the network centric positioning is performed, the UE need not perform blocks 1230, 1240, and 1250. In an aspect, blocks 1240 and 1250 may be performed by the WWAN transceiver 310, the processing system 332, the memory 340, and/or the RTT positioning module 342, any or all of which may be referred to as means for performing this block.

Figure 13:
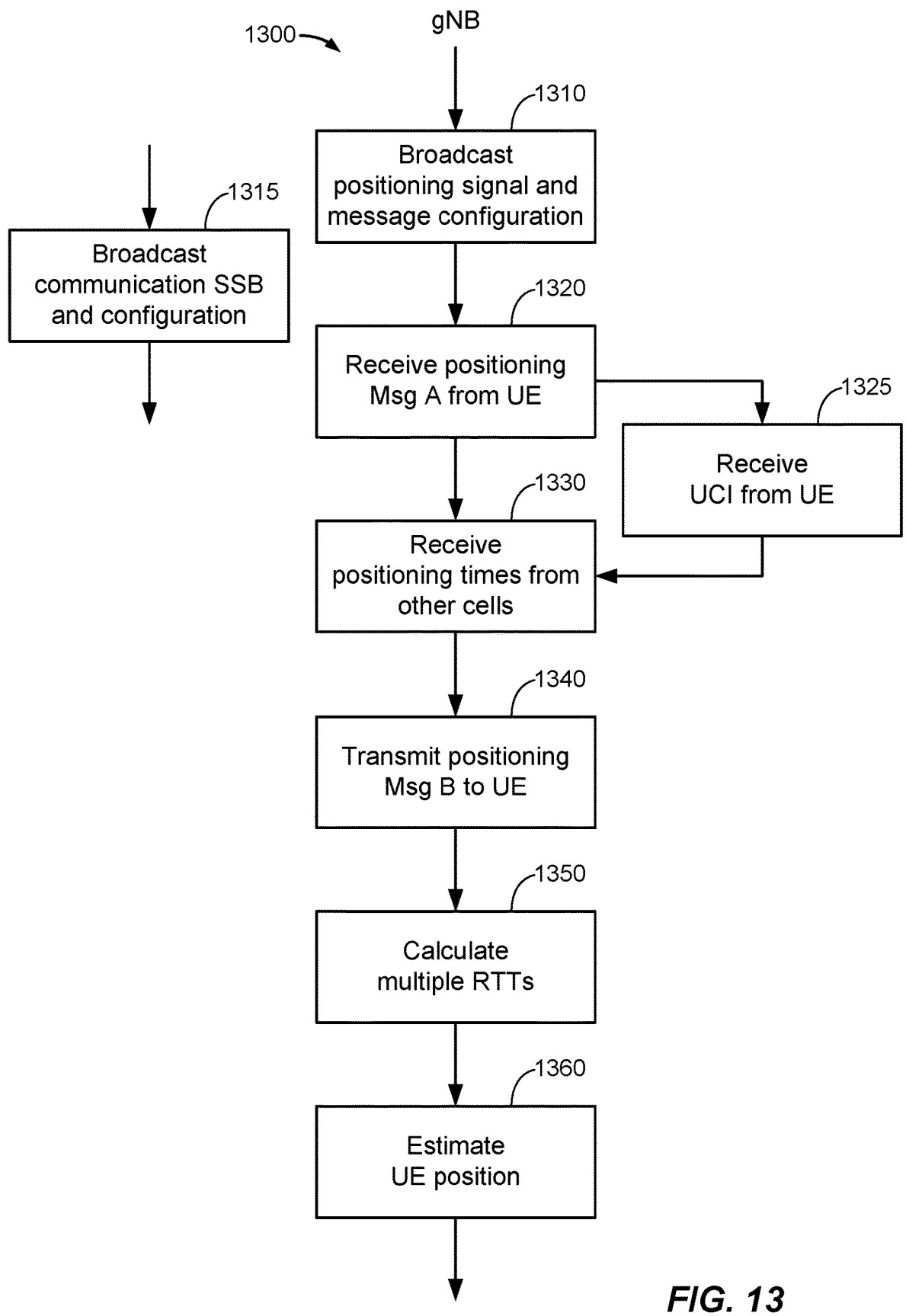
FIG. 13 illustrates another exemplary method performed by a designated cell/TRP to implement the positioning RACH process of FIG. 9 as taught herein.

FIG. 13 illustrates an exemplary method 1300 performed by a cell/TRP (e.g., a cell/TRP of any of the base stations described herein) to implement the positioning RACH procedure 900 of FIG. 9, in which a single positioning Message A is received from the UE and a single positioning Message B is transmitted to the UE. It is recognized that there may be multiple cells/TRPs in communication with the UE. But for the purposes in FIG. 13, the base station supporting the cell/TRP may be viewed as being the, or one of the, base stations designated to determine the position of the UE, i.e., the base station may include a location server.

At block 1310, the cell/TRP broadcasts a positioning signal at a first time (e.g., time $T_1$ in FIG. 9). The positioning signal may be a PRS, a positioning SSB, or some other downlink signal. The cell/TRP also broadcasts a message configuration at block 1310. It should be noted that the cell/TRP is also capable of performing the conventional communication RACH procedure. To illustrate this, at block 1315, the cell/TRP can also broadcast a conventional communication SSB and a communication configuration. In an aspect, blocks 1310 and 1315 may be performed by the WWAN transceiver 350 (specifically transmitter(s) 354), the processing system 384, the memory 386, and/or the RTT positioning module 388, any or all of which may be referred to as means for performing this block.

At block 1320, the cell/TRP receives the positioning Message A, as at time $T_4$ of FIG. 9. The positioning Message A includes the uplink time differences between the reception time at the UE of the positioning signal and the transmission time from the UE of the positioning Message A (e.g., $T_{RX \to Tx}^{UE} = (T_3 - T_2)$ in FIG. 9), the positioning signal types, and when necessary, the IDs of the positioning signals corresponding to multiple cells/TRPs, i.e., corresponding to the plurality of cells/TRPs. In an aspect, block 1320 may be performed by the WWAN transceiver 350 (specifically receiver(s) 352), the processing system 384, the memory 386, and/or the RTT positioning module 388, any or all of which may be referred to as means for performing this block.

At block 1325, the cell/TRP may receive UCI from the UE indicating whether the positioning Message A is for positioning purposes. This may not be necessary if the message configuration is the positioning configuration defining resources used by the UE specifically for positioning purposes. In an aspect, block 1325 may be performed by the WWAN transceiver 350 (specifically receiver(s) 352), the processing system 384, the memory 386, and/or the RTT positioning module 388, any or all of which may be referred to as means for performing this block.

At block 1330, the cell/TRP receives positioning times from other cells/TRPs of the plurality of cells/TRPs. For example, from each cell/TRP, the cell/TRP may receive the transmission time (e.g., $T_1$ in FIG. 9) of the positioning signal from that cell/TRP, and the arrival time (e.g., $T_4$ in FIG. 9) of the positioning Message A to that cell/TRP. In an aspect, block 1330 may be performed by the WWAN transceiver 350 (specifically receiver(s) 352), the processing system 384, the memory 386, and/or the RTT positioning module 388, any or all of which may be referred to as means for performing this block.

At block 1340, the cell/TRP transmits the positioning Message B to the UE, as at time $T_5$ of FIG. 9. The positioning Message B may include multiple downlink time differences between the reception time at a cell/TRP of the positioning Message A and the transmission time at that cell/TRP of the positioning Message B (e.g., $(T_5 - T_4)$ of FIG. 9) for each of the plurality of cells/TRPs. In one aspect, the positioning times received at block 1330 may include the downlink time differences (e.g., $(T_5 - T_4)$ in FIG. 9) for some or all of the plurality of cells/TRPs. Alternatively, the Message B may include the positioning measurements received from some or all of the other cells/TRPs at 1330 (i.e., the transmission time (e.g., $T_1$ in FIG. 9) of the positioning signal from each cell/TRP, and the arrival time (e.g., $T_4$ in FIG. 9) of the positioning Message A at each cell/TRP). Thus, the TRP performing method 1300 receives positioning measurements from other TRPs at 1330 and relays them to the UE in a Message B, as either the raw measurements or the calculated time differences. In an aspect, block 1340 may be performed by the WWAN transceiver 350 (specifically transmitter(s) 354), the processing system 384, the memory 386, and/or the RTT positioning module 388, any or all of which may be referred to as means for performing this block.

At 1350, the cell/TRP may calculate the RTTs between the UE and the plurality of cells/TRPs. If the cell/TRP has the times $T_1$ and $T_4$ of other cells/TRPs (from the positioning times received at block 1330) and the uplink time differences (e.g., $(T_3 - T_2)$ in FIG. 9) (from the positioning Message A received at block 1320), the cell/TRP can utilize equation (2) to determine the RTTs. Then at 1360, the cell/TRP can estimate the UE position based on the multiple RTTs. While note specifically illustrated, instead of or in addition thereto, the cell/TRP may forward the multiple RTTs to a location server or other positioning entity. In an aspect, blocks 1350 and 1360 may be performed by the WWAN transceiver 350, the processing system 384, the memory 386, and/or the RTT positioning module 388, any or all of which may be referred to as means for performing this block.

If only the network centric positioning is to be performed, block 1340 is optional. If only the UE centric positioning is to be performed, blocks 1350 and 1360 are optional.

Figure 14:
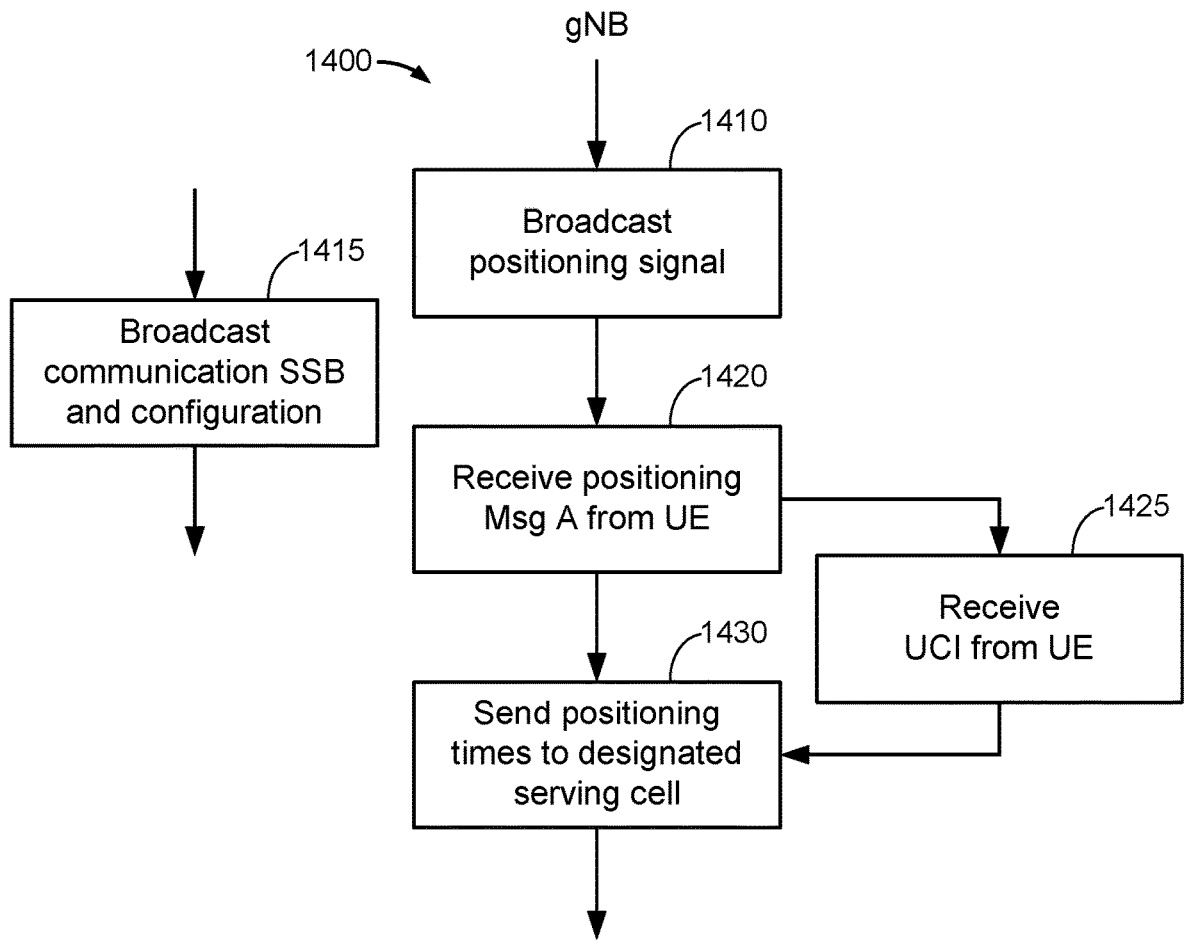
FIG. 14 illustrates an exemplary method performed by a non-designated cell to implement the positioning RACH process of FIG. 9 as taught herein.

FIG. 14 illustrates an exemplary method 1400 performed by a non-designated cell/TRP (e.g., a cell/TRP supported by any of the base stations described herein) or to implement the positioning RACH procedure 900 of FIG. 9. The non-designated cell/TRP may be a non-serving cell/TRP. In cases where there are multiple cells/TRPs in communication with the UE (e.g., where there is a PCell and one or more SCells), the non-designated cell/TRP may be a cell/TRPs that is not designated to determine the position of the UE. Note that a cell/TRP can be a designated cell/TRP on one occasion and be a non-designated cell/TRP in another occasion.

At block 1410, the non-designated cell/TRP broadcasts the positioning signal at a first time (e.g., $T_1$ of FIG. 9). The positioning signal may be a PRS, a positioning SSB, or some other downlink signal. The cell/TRP may, but not necessarily, also broadcast a message configuration at block 1410. It should be noted that the non-designated cell/TRP is also capable of performing a conventional communication RACH procedure. To illustrate this, at block 1415, the cell/TRP can also broadcast a conventional communication SSB and a communication configuration. In an aspect, blocks 1410 and 1415 may be performed by the WWAN transceiver 350 (specifically transmitter(s) 354), the processing system 384, the memory 386, and/or the RTT positioning module 388, any or all of which may be referred to as means for performing this block.

At block 1420, the non-designated cell/TRP receives a positioning Message A, as at time $T_4$ of FIG. 9. The positioning Message A may be the same positioning Message A received by the designated cell/TRP in FIG. 13. At block 1425, the non-designated cell/TRP may receive the UCI from the UE indicating whether the positioning Message A is for positioning purposes. This may not be necessary if the non-designated cell/TRP can determine the purpose of the positioning Message A just from the resources of the positioning Message A. In an aspect, block 1420 may be performed by the WWAN transceiver 350 (specifically receiver(s) 352), the processing system 384, the memory 386, and/or the RTT positioning module 388, any or all of which may be referred to as means for performing this block.

At block 1430, the non-designated cell/TRP transmits the positioning times to the designated cell/TRP. In an aspect, block 1430 may be performed by the WWAN transceiver 350 (specifically transmitter(s) 354), the processing system 384, the memory 386, and/or the RTT positioning module 388, any or all of which may be referred to as means for performing this block.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:
   receiving a positioning configuration message from a transmission-reception point (TRP), the positioning configuration message defining uplink resources configured for use by the UE to send a random access channel (RACH) positioning Message A to the TRP;
measuring a time of arrival (TOA) of each of a plurality of positioning signals from a plurality of TRPs;
transmitting, to the TRP, the RACH positioning Message A on the uplink resources defined in the positioning configuration message, wherein the RACH positioning Message A is such that a TOA measurement resolution of the positioning Message A is higher than a TOA measurement resolution threshold; and
receiving, from the TRP, a RACH positioning Message B subsequent to transmitting the RACH positioning Message A,
wherein the RACH positioning Message A includes a first plurality of positioning measurements corresponding to the plurality of TRPs, or the RACH positioning Message B includes a second plurality of positioning measurements corresponding to the plurality of TRPs, or any combination thereof.

2. The method of claim 1, wherein the TOA measurement threshold is a cyclic prefix (CP) duration or a multiple of a time-sampling duration.

3. The method of claim 1, wherein the TOA measurement threshold is a symbol duration.

4. The method of claim 1, wherein a bandwidth of the RACH positioning Message A is sufficiently wide such that the TOA measurement resolution of the RACH positioning Message A is higher than the TOA measurement resolution threshold.

5. The method of claim 1,
wherein the RACH positioning Message A comprises multiple narrow bandwidth signals such that frequency bands of the multiple narrow bandwidth signals are different from each other, and
wherein a number of the multiple narrow bandwidth signals is such that the TOA measurement resolution of the positioning Message A is higher than the TOA measurement resolution threshold.

6. The method of claim 1, wherein a bandwidth of the plurality of positioning signals is sufficiently wide such that a TOA measurement resolution of the plurality of positioning signals is higher than the TOA measurement resolution threshold.

7. The method of claim 1, wherein the RACH positioning Message A includes a positioning signal type of each of the plurality of positioning signals.

8. The method of claim 7, wherein the positioning signal type of each of the plurality of positioning signals is one of a positioning reference signal (PRS) or a positioning synchronization signal block (SSB).

9. The method of claim 1,
wherein one or more positioning signals of the plurality of positioning signals are PRS, and
wherein for each PRS, the RACH positioning Message A includes a PRS identifier (ID) for that PRS.

10. The method of claim 1, wherein:
the first plurality of positioning measurements included in the RACH positioning Message A includes, for each TRP of the plurality of TRPs, a TOA at the UE of the positioning signal from the TRP and a transmission time of the RACH positioning Message A, or a time difference between the TOA of the positioning signal and the transmission time of the RACH positioning Message A, and
wherein the second plurality of positioning measurements included in the RACH positioning Message B includes a TOA at each of the plurality of TRPs of the RACH positioning Message A and a transmission time of the RACH positioning Message B, or a time difference, for each TRP of the plurality of TRPs, between the TOA of the RACH positioning Message A and the transmission time of the RACH positioning Message B.

11. The method of claim 10, wherein a bandwidth of the RACH positioning Message B is sufficiently wide such that a TOA measurement resolution of the RACH positioning Message B is higher than a TOA measurement resolution threshold.

12. The method of claim 10, further comprising:
calculating, for each TRP, a round trip time (RTT) between the UE and the TRP.

13. The method of claim 12, further comprising:
estimating a UE position based on the multiple RTTs.

14. The method of claim 12, further comprising:
transmitting the RTT for each TRP to a positioning entity.

15. The method of claim 1, wherein the uplink resources configured in the positioning configuration message are different from uplink resources defined in a communication configuration message broadcasted from the TRP, the communication configuration message defining uplink resources configured for use by the UE to establish a communication session with the TRP.

16. The method of claim 15, wherein the positioning configuration message comprises a positioning SSB, and wherein the communication configuration message comprises an SSB1.

17. A method of wireless communication performed by a transmission-reception point (TRP), the method comprising:
broadcasting a positioning configuration message defining uplink resources configured for use by one or more user equipments (UEs) to send a random access channel (RACH) positioning Message A to the TRP;
broadcasting a positioning signal to the one or more UEs;
receiving, from the one or more UEs, the RACH positioning Message A on the uplink resources defined in the positioning configuration message, wherein the RACH positioning Message A is such that a time of arrival (TOA) measurement resolution of the RACH positioning Message A at the TRP is higher than a TOA measurement resolution threshold; and
transmitting, to the one or more UEs, a RACH positioning Message B subsequent to receiving the RACH positioning Message A,
wherein the RACH positioning Message A includes a first plurality of positioning measurements corresponding to a plurality of TRPs measured by the one or more UEs, or the RACH positioning Message B includes a second plurality of positioning measurements corresponding to the plurality of TRPs, or any combination thereof.

18. The method of claim 17, wherein the TOA measurement threshold is a cyclic prefix (CP) duration or a multiple of a time-sampling duration.

19. The method of claim 17, wherein the TOA measurement threshold is a symbol duration.

20. The method of claim 17, wherein a bandwidth of the RACH positioning Message A is sufficiently wide such that the TOA measurement resolution of the RACH positioning Message A is higher than the TOA measurement resolution threshold.

21. The method of claim 17,
wherein the RACH positioning Message A comprises multiple narrow bandwidth signals such that frequency bands of the multiple narrow bandwidth signals are different from each other, and wherein a number of the multiple narrow bandwidth signals is sufficient such that the TOA measurement resolution of the positioning Message A is higher than the TOA measurement resolution threshold.

22. The method of claim 17, wherein a bandwidth of the positioning signal is sufficiently wide such that a TOA measurement resolution of the positioning signal is higher than the TOA measurement resolution threshold.

23. The method of claim 17, wherein the RACH positioning Message A includes a positioning signal type of each of a plurality of positioning signals received by the one or more UEs from the plurality of TRPs.

24. The method of claim 23, wherein the positioning signal type of each of the plurality of positioning signals is one of a positioning reference signal (PRS) or a positioning synchronization signal block (SSB).

25. The method of claim 23,
wherein one or more positioning signals of the plurality of positioning signals are PRS, and
wherein for each PRS, the RACH positioning Message A includes a PRS identifier (ID) for that PRS.

26. The method of claim 17, wherein:
the first plurality of positioning measurements included in the RACH positioning Message A includes, for each TRP of the plurality of TRPs, a TOA at the UE of a positioning signal from the TRP and a transmission time of the RACH positioning Message A, or a time difference between the TOA of the positioning signal and the transmission time of the RACH positioning Message A, and
wherein the second plurality of positioning measurements included in the RACH positioning Message B includes a TOA at each of the plurality of TRPs of the RACH positioning Message A and a transmission time of the RACH positioning Message B, or a time difference, for each TRP of the plurality of TRPs, between the TOA of the RACH positioning Message A and the transmission time of the RACH positioning Message B.

27. The method of claim 17, further comprising:
receiving positioning measurements from the plurality of TRPs, wherein for each TRP, the positioning measurement for the TRP includes the TOA of the RACH positioning Message A at that TRP.

28. The method of claim 27, wherein the positioning measurements from the plurality of TRPs further include, for each TRP, a time difference between the TOA of the RACH positioning Message A at that TRP and the transmission time of the RACH positioning Message B from that TRP.

29. The method of claim 27, further comprising:
transmitting, to the UE, the positioning measurements received from the plurality of TRPs in a RACH positioning Message B.

30. The method of claim 17, further comprising:
determining, for each TRP of the plurality of TRPs, a round trip time (RTT) between the UE and that TRP.

31. The method of claim 30, further comprising:
estimating a UE position based on the plurality of RTTs.

32. The method of claim 30, further comprising:
transmitting the plurality of RTTs for the plurality of TRPs to a positioning entity.

33. The method of claim 30, wherein the determining comprises calculating the plurality of RTTs for the plurality of TRPs.

34. The method of claim 30, wherein the determining comprises receiving the plurality of RTTs from the plurality of TRPs.

35. The method of claim 17, wherein the uplink resources configured in the positioning configuration message are different from uplink resources defined in a communication configuration message broadcasted from the TRP, the communication configuration message defining uplink resources configured for use by the UE to establish a communication session with the TRP.

36. The method of claim 35, wherein the positioning configuration message comprises a positioning SSB, and wherein the communication configuration message comprises an SSB1.

37. A user equipment (UE), comprising:
a transceiver circuitry;
a memory circuitry; and
a processor circuitry,
wherein the transceiver circuitry, the memory circuitry, and the processor circuitry are configured to:
receive a positioning configuration message from a transmission-reception point (TRP), the positioning configuration message defining uplink resources configured for use by the UE to send a random access channel (RACH) positioning Message A to the TRP;
measure a time of arrival (TOA) of each of a plurality of positioning signals from a plurality of TRPs;
transmit, to the TRP, the RACH positioning Message A on the uplink resources defined in the positioning configuration message, wherein the RACH positioning Message A is such that a TOA measurement resolution of the positioning Message A is higher than a TOA measurement resolution threshold; and
receive, from the TRP, a RACH positioning Message B subsequent to transmission of the RACH positioning Message A,
wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

38. The UE of claim 37, wherein the TOA measurement threshold is a cyclic prefix (CP) duration or a multiple of a time-sampling duration.

39. The UE of claim 37, wherein the TOA measurement threshold is a symbol duration.

40. The UE of claim 37, wherein a bandwidth of the RACH positioning Message A is sufficiently wide such that the TOA measurement resolution of the RACH positioning Message A is higher than the TOA measurement resolution threshold.

41. The UE of claim 37,
wherein the RACH positioning Message A comprises multiple narrow bandwidth signals such that frequency bands of the multiple narrow bandwidth signals are different from each other, and
wherein a number of the multiple narrow bandwidth signals is such that the TOA measurement resolution of the positioning Message A is higher than the TOA measurement resolution threshold.

42. The UE of claim 37, wherein a bandwidth of the plurality of positioning signals is sufficiently wide such that a TOA measurement resolution of the plurality of positioning signals is higher than the TOA measurement resolution threshold.

43. The UE of claim 37, wherein the RACH positioning Message A includes a positioning signal type of each of the plurality of positioning signals.

44. The UE of claim 43, wherein the positioning signal type of each of the plurality of positioning signals is one of a positioning reference signal (PRS) or a positioning synchronization signal block (SSB).

45. The UE of claim 37,
wherein one or more positioning signals of the plurality of positioning signals are PRS, and
wherein for each PRS, the RACH positioning Message A includes a PRS identifier (ID) for that PRS.

46. The UE of claim 37, wherein:
the first plurality of positioning measurements included in the RACH positioning Message A includes, for each TRP of the plurality of TRPs, a TOA at the UE of the positioning signal from the TRP and a transmission time of the RACH positioning Message A, or a time difference between the TOA of the positioning signal and the transmission time of the RACH positioning Message A, and
wherein the second plurality of positioning measurements included in the RACH positioning Message B includes a TOA at each of the plurality of TRPs of the RACH positioning Message A and a transmission time of the RACH positioning Message B, or a time difference, for each TRP of the plurality of TRPs, between the TOA of the RACH positioning Message A and the transmission time of the RACH positioning Message B.

47. The UE of claim 46, wherein a bandwidth of the RACH positioning Message B is sufficiently wide such that a TOA measurement resolution of the RACH positioning Message B is higher than a TOA measurement resolution threshold.

48. The UE of claim 46, wherein the transceiver circuitry, the memory circuitry, and the processor circuitry are further configured to:
calculate, for each TRP, a round trip time (RTT) between the UE and the TRP.

49. The UE of claim 48, wherein the transceiver circuitry, the memory circuitry, and the processor circuitry are further configured to:
estimate a UE position based on the multiple RTTs.

50. The UE of claim 48, wherein the transceiver circuitry, the memory circuitry, and the processor circuitry are further configured to:
transmit the RTT for each TRP to a positioning entity.

51. The UE of claim 37, wherein the uplink resources configured in the positioning configuration message are different from uplink resources defined in a communication configuration message broadcasted from the TRP, the communication configuration message defining uplink resources configured for use by the UE to establish a communication session with the TRP.

52. The UE of claim 51, wherein the positioning configuration message comprises a positioning SSB, and wherein the communication configuration message comprises an SSB1.

53. A transmission-reception point (TRP) of a network, comprising:
a transceiver circuitry;
a memory circuitry; and
a processor circuitry,
wherein the transceiver circuitry, the memory circuitry, and the processor circuitry are configured to:
broadcast a positioning configuration message defining uplink resources configured for use by one or more user equipments (UEs) to send a random access channel (RACH) positioning Message A to the TRP;
broadcast a positioning signal to the one or more UEs;
receive, from the one or more UEs, the RACH positioning Message A on the uplink resources defined in the positioning configuration message, wherein the RACH positioning Message A is such that a time of arrival (TOA) measurement resolution of the RACH positioning Message A at the TRP is higher than a TOA measurement resolution threshold; and
transmit, to the one or more UEs, a RACH positioning Message B subsequent to reception of the RACH positioning Message A,
wherein the RACH positioning Message A includes a first plurality of positioning measurements corresponding to a plurality of TRPs measured by the one or more UEs, the RACH positioning Message B includes a second plurality of positioning measurements corresponding to the plurality of TRPs, or any combination thereof.

54. The TRP of claim 53, wherein the TOA measurement threshold is a cyclic prefix (CP) duration or a multiple of a time-sampling duration.

55. The TRP of claim 53, wherein the TOA measurement threshold is a symbol duration.

56. The TRP of claim 53, wherein a bandwidth of the RACH positioning Message A is sufficiently wide such that the TOA measurement resolution of the RACH positioning Message A is higher than the TOA measurement resolution threshold.

57. The TRP of claim 53,
wherein the RACH positioning Message A comprises multiple narrow bandwidth signals such that frequency bands of the multiple narrow bandwidth signals are different from each other, and
wherein a number of the multiple narrow bandwidth signals is sufficient such that the TOA measurement resolution of the positioning Message A is higher than the TOA measurement resolution threshold.

58. The TRP of claim 53, wherein a bandwidth of the positioning signal is sufficiently wide such that a TOA measurement resolution of the positioning signal is higher than the TOA measurement resolution threshold.

59. The TRP of claim 53, wherein the RACH positioning Message A includes a positioning signal type of each of a plurality of positioning signals received by the one or more UEs from the plurality of TRPs.

60. The TRP of claim 59, wherein the positioning signal type of each of the plurality of positioning signals is one of a positioning reference signal (PRS) or a positioning synchronization signal block (SSB).

61. The TRP of claim 59,
wherein one or more positioning signals of the plurality of positioning signals are PRS, and
wherein for each PRS, the RACH positioning Message A includes a PRS identifier (ID) for that PRS.

62. The TRP of claim 53, wherein:
the first plurality of positioning measurements included in the RACH positioning Message A includes, for each TRP of the plurality of TRPs, a TOA at the UE of a positioning signal from the TRP and a transmission time of the RACH positioning Message A, or a time difference between the TOA of the positioning signal and the transmission time of the RACH positioning Message A, and
wherein the second plurality of positioning measurements included in the RACH positioning Message B includes a TOA at each of the plurality of TRPs of the RACH positioning Message A and a transmission time of the RACH positioning Message B, or a time difference, for each TRP of the plurality of TRPs, between the TOA of the RACH positioning Message A and the transmission time of the RACH positioning Message B.

63. The TRP of claim 53, wherein the transceiver circuitry, the memory circuitry, and the processor circuitry are further configured to:
receive positioning measurements from the plurality of TRPs, wherein for each TRP, the positioning measurement for the TRP includes the TOA of the RACH positioning Message A at that TRP.

64. The TRP of claim 63, wherein the positioning measurements from the plurality of TRPs further include, for each TRP, a time difference between the TOA of the RACH positioning Message A at that TRP and the transmission time of the RACH positioning Message B from that TRP.

65. The TRP of claim 63, wherein the transceiver circuitry, the memory circuitry, and the processor circuitry are further configured to:
transmit, to the UE, the positioning measurements from the plurality of TRPs in a RACH positioning Message B.

66. The TRP of claim 53, wherein the transceiver circuitry, the memory circuitry, and the processor circuitry are further configured to:
determine, for each TRP of the plurality of TRPs, a round trip time (RTT) between the UE and that TRP.

67. The TRP of claim 66, wherein the transceiver circuitry, the memory circuitry, and the processor circuitry are further configured to:
estimate a UE position based on the plurality of RTTs.

68. The TRP of claim 66, wherein the transceiver circuitry, the memory circuitry, and the processor circuitry are further configured to:
transmit the plurality of RTTs for the plurality of TRPs to a positioning entity.

69. The TRP of claim 66, wherein the transceiver circuitry, the memory circuitry, and the processor circuitry being configured to determine comprises the transceiver circuitry, the memory circuitry, and the processor circuitry being configured to calculate the plurality of RTTs for the plurality of TRPs.

70. The TRP of claim 66, wherein the transceiver circuitry, the memory circuitry, and the processor circuitry being configured to determine comprises the transceiver circuitry, the memory circuitry, and the processor circuitry being configured to receive the plurality of RTTs from the plurality of TRPs.

71. The TRP of claim 53, wherein the uplink resources configured in the positioning configuration message are different from uplink resources defined in a communication configuration message broadcasted from the TRP, the communication configuration message defining uplink resources configured for use by the UE to establish a communication session with the TRP.

72. The TRP of claim 71, wherein the positioning configuration message comprises a positioning SSB, and wherein the communication configuration message comprises an SSB1.

73. A user equipment (UE), comprising:
means for receiving a positioning configuration message from a transmission-reception point (TRP), the positioning configuration message defining uplink resources configured for use by the UE to send a random access channel (RACH) positioning Message A to the TRP;
means for measuring a time of arrival (TOA) of each of a plurality of positioning signals from a plurality of TRPs;
means for transmitting, to the TRP, the RACH positioning Message A on the uplink resources defined in the positioning configuration message, wherein the RACH positioning Message A is such that a TOA measurement resolution of the positioning Message A is higher than a TOA measurement resolution threshold; and
means for receiving, from the TRP, a RACH positioning Message B subsequent to transmission of the RACH positioning Message A,
wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

74. A transmission-reception point (TRP), comprising:
means for broadcasting a positioning configuration message defining uplink resources configured for use by one or more user equipments (UEs) to send a random access channel (RACH) positioning Message A to the TRP;
means for broadcasting a positioning signal to the one or more UEs;
means for receiving, from the one or more UEs, the RACH positioning Message A on the uplink resources defined in the positioning configuration message, wherein the RACH positioning Message A is such that a time of arrival (TOA) measurement resolution of the RACH positioning Message A at the TRP is higher than a TOA measurement resolution threshold; and
means for transmitting, to the one or more UEs, a RACH positioning Message B subsequent to reception of the RACH positioning Message A,
wherein the RACH positioning Message A includes a first plurality of positioning measurements corresponding to a plurality of TRPs measured by the one or more UEs, the RACH positioning Message B includes a second plurality of positioning measurements corresponding to the plurality of TRPs, or any combination thereof.

75. A non-transitory computer-readable medium storing computer-executable instructions, the computer-executable instructions comprising:
at least one instruction instructing a user equipment (UE) to receive a positioning configuration message from a transmission-reception point (TRP), the positioning configuration message defining uplink resources configured for use by the UE to send a random access channel (RACH) positioning Message A to the TRP;
at least one instruction instructing the UE to measure a time of arrival (TOA) of each of a plurality of positioning signals from a plurality of TRPs;
at least one instruction instructing the UE to transmit, to the TRP, the RACH positioning Message A on the uplink resources defined in the positioning configuration message, wherein the RACH positioning Message A is such that a TOA measurement resolution of the positioning Message A is higher than a TOA measurement resolution threshold; and
at least one instruction instructing the UE to receive, from the TRP, a RACH positioning Message B subsequent to transmission of the RACH positioning Message A,
wherein the RACH positioning Message A includes a first plurality of positioning measurements corresponding to the plurality of TRPs, the RACH positioning Message B includes a second plurality of positioning measurements corresponding to the plurality of TRPs, or any combination thereof.

76. A non-transitory computer-readable medium storing computer-executable instructions, the computer-executable instructions comprising:
- at least one instruction instructing a transmission-reception point (TRP) to broadcast a positioning configuration message defining uplink resources configured for use by one or more user equipments (UEs) to send a random access channel (RACH) positioning Message A to the TRP;
- at least one instruction instructing the TRP to broadcast a positioning signal to the one or more UEs;
- at least one instruction instructing the TRP to receive, from the one or more UEs, the RACH positioning Message A on the uplink resources defined in the positioning configuration message, wherein the RACH positioning Message A is such that a time of arrival (TOA) measurement resolution of the RACH positioning Message A at the TRP is higher than a TOA measurement resolution threshold; and
- at least one instruction instructing the TRP to transmit, to the one or more UEs, a RACH positioning Message B subsequent to receiving the RACH positioning Message A,
- wherein the RACH positioning Message A includes a first plurality of positioning measurements corresponding to a plurality of TRPs measured by the one or more UEs, the RACH positioning Message B includes a second plurality of positioning measurements corresponding to the plurality of TRPs, or any combination thereof.

* * * * *